(12) United States Patent
Hirose

(10) Patent No.: US 7,787,063 B2
(45) Date of Patent: Aug. 31, 2010

(54) OPTICAL ELEMENT AND OPTICAL PICKUP

(75) Inventor: Satoru Hirose, Sakai (JP)

(73) Assignee: Konica Minolta Holdings, Inc., Tokyo (JP)

( * ) Notice: Subject to any disclaimer, the term of this patent is extended or adjusted under 35 U.S.C. 154(b) by 905 days.

(21) Appl. No.: 11/447,772

(22) Filed: Jun. 6, 2006

(65) Prior Publication Data

US 2006/0273284 A1 Dec. 7, 2006

(30) Foreign Application Priority Data

Jun. 7, 2005 (JP) ............................. 2005-166563
Dec. 8, 2005 (JP) ............................. 2005-354449

(51) Int. Cl.
*G02F 1/13* (2006.01)

(52) U.S. Cl. ............................. 349/2; 349/201; 349/202

(58) Field of Classification Search ........................ None
See application file for complete search history.

(56) References Cited

U.S. PATENT DOCUMENTS 5,508,831 A * 4/1996 Nakamura et al. ............. 349/86

FOREIGN PATENT DOCUMENTS

| JP | 63-249125 (A) | 10/1988 |
|---|---|---|
| JP | 2001-176108 (A) | 6/2001 |
| JP | 3538520 | 3/2004 |
| JP | 2004-334028 (A) | 11/2004 |

OTHER PUBLICATIONS

Susumu Sato, "Liquid-Crystal Lens-Cells with Variable Focal Length", Jpn. J. Appl. Phys., vol. 18, No. 9, Sep. 1979, pp. 1679-1684.
Mao Ye and Susumu Sato, "Optical Properties of Liquid Crystal Lens of Any Size", Jpn. J. Appl. Phys., vol. 41, No. 5B, May 2002, pp. L571-L573.

* cited by examiner

*Primary Examiner*—David Nelms
*Assistant Examiner*—Lucy P Chien
(74) *Attorney, Agent, or Firm*—Sidley Austin LLP

(57) ABSTRACT

On one side of a liquid crystal layer, a first electrode is provided, and, on the other side of the liquid crystal layer, a second electrode, composed of a plurality of individual electrodes, and a third electrode are provided. The second and third electrodes have holes that are increasingly small away from the liquid crystal layer. When the potential at the third electrode is set equal to or lower than the potential at the second electrode, the liquid crystal layer acts as a convex lens; when the potential at the third electrode is set higher than the potential at the second electrode, the liquid crystal layer acts as a concave lens. The range in which the focal length can be varied depends on the diameters of the holes, and giving the holes of the different electrodes varying diameters helps widen the range. Moreover, conductors can be laid to reach the electrodes at the outer edges thereof so as not to directly face the liquid crystal layer. This helps eliminate the influence of the conductors on the electric field distribution in the liquid crystal layer.

27 Claims, 20 Drawing Sheets

OPTICAL ELEMENT AND OPTICAL PICKUP

This application is based on Japanese Patent Application No. 2005-166563 filed on Jun. 7, 2005 and Japanese Patent Application No. 2005-354449 filed on Dec. 8, 2005, the contents of both of which are hereby incorporated by reference.

BACKGROUND OF THE INVENTION

1. Field of the Invention

The present invention relates to an optical element using a liquid crystal, and to an optical pickup incorporating such an optical element.

2. Description of Related Art

A liquid crystal that has dielectric constant anisotropy exhibits electric field dependence; that is, it varies its molecular alignment according to the directions of electric force lines. Thus, as the electric field is controlled, the optical characteristics of the liquid crystal can be controlled. This has led to proposals of various optical elements using liquid crystals.

Patent Document 1, listed below, proposes a variable-focus optical system wherein, as shown in FIG. 28, ring-shaped electrodes 101 are arranged concentrically in a pattern of a Fresnel zone plate. This makes it possible to produce, on a liquid crystal panel, a pattern of a Fresnel zone plate of which the spatial frequency can be controlled electrically.

Non-patent Document 1, listed below, discloses an optical element that can vary its focal length by so controlling a voltage as to vary the refractive index distribution of a liquid crystal arranged between electrodes having openings.

Non-patent Document 2, listed below, proposes a liquid crystal lens that is built as a convex lens (having a positive focal length) or concave lens (having a negative focal length) having a liquid crystal sealed between a plano-convex lens or plano-concave lens and a flat-plate glass substrate. In this liquid crystal lens, as the electric field distribution in its liquid crystal portion is controlled, its focal length can be varied in a positive or negative range.

Patent Documents 2 to 4, listed below, disclose optical elements that permit correction of coma. Specifically, Patent Document 2 proposes an optical element wherein, in positions corresponding to openings formed in pattern electrodes (positions deviated from the openings along the optical axis), transparent electrode layers are laid in separate layers from the pattern electrodes. This structure helps eliminate the influence of the potential varying abruptly at the openings in the pattern electrodes, and thus helps enhance the accuracy of aberration correction.

Patent Document 3 proposes an optical element wherein, in openings formed in a transparent electrode, a transparent high-resistance film is laid so that the transparent electrode has apparently no openings at all. This structure helps prevent diffraction of light that occurs between different parts of the transparent electrode, and thus helps obtain a satisfactory optical signal. That is, with no openings in the transparent electrode, there is no place where the potential is locally equal to the reference potential (0 V), nor does diffraction of light occur; thus the loss of light can be minimized.

Patent Document 4 proposes wavefront aberration correcting means and an optical pickup that involve electrodes divided into a shape corresponding to the wavefront aberration distribution attributable to the tilt angle of an optical disc. With this structure, even when the optical disc tilts during reproduction from it, the light spot formed on the recording surface of the optical disc can be so corrected that the magnitude of the wavefront aberration attributable to the tilt is suppressed within a predetermined rage. This ensures satisfactory reproduction.

The patent and non-patent documents mentioned above are as follows:

Patent Document 1: JP-A-S63-249125 (pp. 156 and 157, and FIG. 5)

Non-patent Document 1: Jpn. J. Appl. Phys., Vol. 41, No. 5, p. L571

Non-patent Document 2: Jpn. J. Appl. Phys., Vol. 18, pp. 1679 and 1979

Patent Document 2: JP-A-2001-176108

Patent Document 3: JP-A-2004-334028

Patent Document 4: JP-B-3538520

The conventional structures described above, however, have the following disadvantages. In the variable-focus optical system according to Patent Document 1, the ring-shaped electrodes 101 have parts of them cut apart (made discontinuous) to leave a space for laying conductors 102 for applying voltages to the electrodes 101. As a result, the electric field distribution in the liquid crystal portion is influenced by the area where the electrodes are cut apart and by the conductors. This causes the pattern of the Fresnel zone plate that is produced on the liquid crystal panel to be deformed from the ideal concentric shape, and may thus lead to degraded optical characteristics.

In the optical element according to Non-patent Document 1, the range in which the focal length can be varied depends largely on the diameter of the openings in the electrodes and on the distance between the electrodes. This results in the focal length being variable only in a range narrower than is expected. With the optical element according to Non-patent Document 2, the focal length can be varied, indeed, but only in a positive range when a plano-convex lens is used and only in a negative range when a plano-concave lens is used.

In any of the optical elements according to Patent Documents 2 to 4, which can correct coma, the electrodes are laid wherever aberration needs to be corrected. Thus, the electrodes are laid in insular segments where coma has peaks. Accordingly, conductors for applying voltages to the electrodes in insular segments need to be laid to cross the optical path. Consequently, the electric field distribution produced by the electrodes is influenced by the conductors.

Thus, in the structure of any of the optical elements according to Patent Documents 1 to 4, the conductors leading to the electrodes are located in the optical path. Disadvantageously, this degrades the characteristics of these optical elements.

SUMMARY OF THE INVENTION

In view of the conventionally experienced disadvantages discussed above, it is an object of the present invention to provide an optical element using a liquid crystal, and also an optical pickup incorporating it, wherein an electrode (for example, a ring-shaped electrode) having an opening has no part of it cut apart (made discontinuous), so that the electric field distribution produced by the electrode is not influenced by a conductor. It is another object of the present invention to provide an optical element, and also an optical pickup incorporating it, of which the focal length can be varied over a wide range encompassing both positive and negative focal lengths.

To achieve the above object, according to one aspect of the present invention, an optical element is provided with: a liquid crystal layer; a first transparent substrate arranged on one side of the liquid crystal layer; a first electrode transparent and arranged on the one side of the liquid crystal layer; a second transparent substrate arranged on the other side of the liquid crystal layer; a second electrode arranged on the other side of the liquid crystal layer and including a plurality of individual electrodes having holes; a third electrode arranged on the side of the second electrode facing away from the liquid crystal layer; an insulating layer laid between the individual electrodes and the third electrode; and a voltage applier for applying voltages between the first electrode and the second and third electrodes. Here, the holes of the individual electrodes are increasingly small away from the liquid crystal layer.

In this structure, voltages are applied between, on one hand, the first electrode and, on the other hand, the second electrode, which is composed of a plurality of individual electrodes having holes, and the third electrode. This produces an electric field, which re-aligns the liquid crystal molecules in the liquid crystal layer and thereby varies the refractive index distribution of the liquid crystal layer. Thus, the optical element according to this aspect of the present invention acts as a lens of which the focal length can be varied in a range encompassing positive and negative focal lengths. Moreover, since the second and third electrodes are laid on each other, conductors can be fitted thereto without forming cuts in those electrodes. This helps produce an ideal electric field distribution.

Moreover, building the second electrode with a plurality of individual electrodes having holes with varying diameters helps widen the range in which the focal length can be varied. Furthermore, forming the holes of the individual electrodes increasingly small away from the liquid crystal layer makes it possible to control the electric field distribution finely.

Of the individual electrodes, the one closest to the liquid crystal layer may have a transparent part within the optical path. This helps avoid a lowering in the transmissivity of the individual electrode closest to the liquid crystal layer to the light transmitted therethrough.

According to another aspect of the present invention, an optical element is provided with: a liquid crystal layer; a first transparent substrate arranged on one side of the liquid crystal layer; a first electrode transparent and arranged on the one side of the liquid crystal layer; a second transparent substrate arranged on the other side of the liquid crystal layer; a second electrode arranged on the other side of the liquid crystal layer and including one or more individual electrodes having holes; a third electrode arranged on the side of the second electrode facing away from the liquid crystal layer; an insulating layer arranged between the individual electrodes and the third electrode; and a voltage applier for applying voltages between the first electrode and the second and third electrodes. Here, of the individual electrodes of the second electrode, the one closest to the liquid crystal layer has a transparent part within the optical path, and is so formed as to be continuous within the optical path and to have a hole within the optical path.

In this structure, voltages are applied between, on one hand, the first electrode and, on the other hand, the second electrode, which includes one or more individual electrodes having holes, and the third electrode. This produces an electric field, which re-aligns the liquid crystal molecules in the liquid crystal layer and thereby varies the refractive index distribution of the liquid crystal layer. Thus, the optical element according to this aspect of the present invention acts as a lens of which the focal length can be varied in a range encompassing positive and negative focal lengths. Moreover, since the second and third electrodes are laid on each other, conductors can be fitted thereto without forming cuts in those electrodes. This helps produce an ideal electric field distribution.

In particular, of the individual electrodes of the second electrode, the one closest to the liquid crystal layer is so formed as to be continuous within the optical path. Thus, simply by forming this individual electrode so that a part thereof protrudes out of the optical path, it is possible to provide, outside the optical path, a conductor for applying a voltage to that individual electrode so that the voltage can be applied to the entire individual electrode. Thus, in this case, there is no need to provide the conductor within the optical path. This also helps eliminate the influence of the conductor on the electric field distribution, and helps produce an ideal electric field distribution. As a result, it is possible to avoid degradation of the characteristics of the optical element attributable to the conductor.

Moreover, the above-mentioned individual electrode has a hole within the optical path, and thus, by varying the electric field distribution according to where to form the hole, it is possible to correct various kinds of aberration. Furthermore, the above-mentioned individual electrode has a transparent part within the optical path. This helps avoid a lowering in the transmissivity of the individual electrode to the light transmitted therethrough.

According to another aspect of the present invention, an optical element is provided with: a liquid crystal layer; a first transparent substrate arranged on one side of the liquid crystal layer; a first electrode arranged on the one side of the liquid crystal layer and including a plurality of individual electrodes having holes; a second electrode arranged on the side of the first electrode facing away from the liquid crystal layer; a first insulating layer for insulating the individual electrodes of the first electrode from the second electrode; a second transparent substrate arranged on the other side of the liquid crystal layer; a third electrode arranged on the other side of the liquid crystal layer and including a plurality of individual electrodes having holes; a fourth electrode arranged on the side of the third electrode facing away from the liquid crystal layer; a second insulating layer for insulating the individual electrodes of the third electrode from the fourth electrode; and a voltage applier for applying voltages between the first and second electrodes and the third and fourth electrodes. Here, the holes of the individual electrodes of the first electrode are increasingly small away from the liquid crystal layer, and the holes of the individual electrodes of the third electrode are increasingly small away from the liquid crystal layer.

By arranging the first and second electrodes on one side of the liquid crystal layer and the third and fourth electrodes on the other in this way, it is possible to control the electric field distribution of the optical element more finely, and thereby to enhance the accuracy with which the liquid crystal layer acts as a lens or the like.

According to another aspect of the present invention, an optical element is provided with: a liquid crystal layer; transparent substrates arranged one on each side of the liquid crystal layer; electrodes arranged one on each side of the liquid crystal layer; and a voltage applier for applying voltages to the electrodes to vary the alignment of the liquid crystal molecules in the liquid crystal layer. Here, the electrode arranged on one side of the liquid crystal layer is composed of a plurality of individual electrodes that are laid on one another with an insulating layer laid in between, and, of the individual electrodes, the one closest to the liquid crystal layer has a transparent part within the optical path, and is so formed as to be continuous within the optical path and to have a hole within the optical path.

In this structure, of the individual electrodes formed on one side of the liquid crystal layer, the one closest to the liquid crystal layer is so formed as to be continuous within the optical path. Thus, simply by forming this individual electrode so that a part thereof protrudes out of the optical path, it is possible to provide, outside the optical path, a conductor for applying a voltage to that individual electrode so that the voltage can be applied to the entire individual electrode. Thus, in this case, there is no need to provide the conductor within the optical path. This helps eliminate the influence of the conductor on the electric field distribution, and helps produce an ideal electric field distribution. As a result, it is possible to avoid degradation of the characteristics of the optical element attributable to the conductor.

Moreover, the above-mentioned individual electrode has a hole within the optical path, and thus, by varying the electric field distribution according to where to form the hole, it is possible to correct various kinds of aberration. Specifically, for example, forming the hole so that the center thereof coincides with the optical axis makes it possible to correct spherical aberration; forming the hole in a position corresponding to a peak of coma makes it possible to correct coma.

Moreover, the above-mentioned individual electrode has a transparent part within the optical path. This helps avoid a lowering in the transmissivity of the individual electrode to the light transmitted therethrough.

According to still another aspect of the present invention, an optical pickup is provided with an optical element, like one of those described above, according to the present invention. Since an optical element according to the present invention helps avoid degradation of characteristics resulting from disturbance in an electric field distribution attributable to conductors, incorporating one in an optical pickup helps enhance the accuracy with which information is recorded to and reproduced from an optical recording medium.

BRIEF DESCRIPTION OF THE DRAWINGS

The above and other objects and features of the present invention will become clear through the following description of preferred embodiments taken in conjunction with the accompanying drawings, in which.

DETAILED DESCRIPTION OF PREFERRED EMBODIMENTS

First Embodiment

Figure 1:
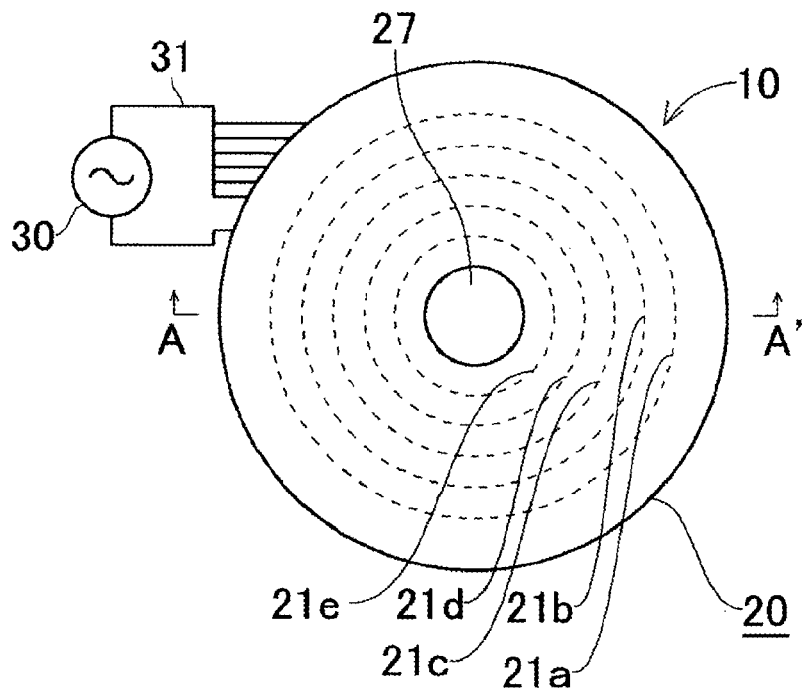
FIG. 1 is a plan view of the optical element of a first embodiment of the present invention.
Figure 2:
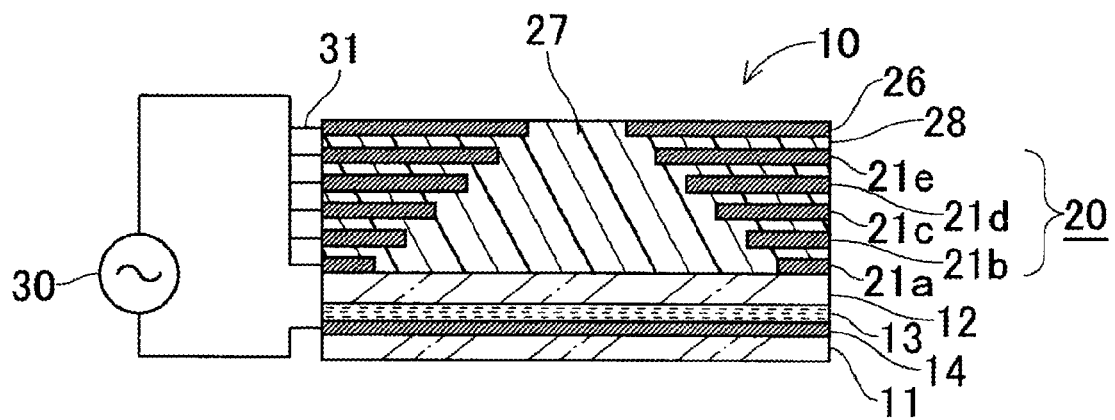
FIG. 2 is a cross-sectional view along line A-A' shown in FIG. 1 as viewed in the arrow-indicated direction.

A first embodiment of the present invention will be described below with reference to the relevant drawings. FIG. 1 is a plan view of the optical element of the first embodiment, and FIG. 2 is a cross-sectional view thereof alone line A-A' shown in FIG. 1 as viewed in the arrow-indicated direction.

First, the structure of the optical element 10 will be described. As shown in FIGS. 1 and 2, in the optical element 10, a first transparent substrate 11 and a second transparent substrate 12 that have equal exterior diameters and are circular in shape are arranged to face each other at a distance from each other, with a liquid crystal layer 13 sealed in between. Over the entire surface of the first transparent substrate 11 facing toward the liquid crystal layer 13, a first electrode 14 that is transparent is laid.

On the surface of the second transparent substrate 12 facing away from the liquid crystal layer 13, a second electrode 20 is laid. The second electrode 20 is composed of a plurality of individual electrodes 21a to 21e that are transparent. The individual electrodes 21a to 21e have the same exterior diameter as the second transparent substrate 12, have circular holes 27 one each, and are separated from one another with insulating layers 28. The holes of the individual electrodes 21a to 21e are increasingly large toward the liquid crystal layer 13, and, when viewed from a perspective perpendicular to the liquid crystal layer 13, the individual electrodes 21a to 21e have the centers thereof at the same point, describing concentric circles.

On the surface of the second electrode 20 facing away from the liquid crystal layer 13, a third electrode 26 that is transparent is laid. The third electrode 26 is separated from the second electrode 20 with an insulating layer 28, has the same exterior diameter as the second electrode 20, and has a hole 27 smaller than the smallest among the holes 27 of the second electrode 20, that is, smaller than the hole 27 of the individual electrode 21e. Here, when viewed from a perspective perpendicular to the liquid crystal layer 13, the hole 27 of the third electrode 26 also describes a circle concentric with those described by the holes 27 of the second electrode 20.

The first transparent substrate 11 and the second transparent substrate 12 are each formed as a transparent insulating member formed of, for example, glass or resin. The first electrode 14, the second electrode 20, and the third electrode 26 are each formed of an electrically conductive, optically transmissive substance such as indium tin oxide (ITO).

To the optical element 10, voltage applying means 30 (a voltage applier) is connected. From the outer edge of each electrode, a conductor 31 formed of conductive metal wire runs to the voltage applying means 30. The voltage applying means 30 applies in-phase alternating-current voltages between the first electrode 14 and the second and third electrodes 20 and 26. The voltages applied by the voltage applying means 30 may be direct-current voltages.

In the structure described above, the individual electrodes 21a to 21e of the second electrode 20 and the third electrode 26 each have the shape of a continuous ring without a cut. Moreover, when viewed from a perspective perpendicular to the liquid crystal layer 13, the second electrode 20 and the third electrode 26 leave no gap among them. Thus, the conductors 31 do not directly face the liquid crystal layer 13, and hence do not influence the electric field produced when voltages are applied between the first electrode 14 and the second and third electrodes 20 and 26. This makes it possible to produce a disturbance-free electric field that is axisymmetric about the center axis through the holes 27.

Next, a description will be given of the voltage control in the optical element 10. When the voltage applying means 30 applies voltages between the first electrode 14 and the second and third electrodes 20 and 26 so that the potentials at the second electrode 20 and at the third electrode 26 are equal relative to the potential at the first electrode 14, there is produced, between the first electrode 14 and the second and third electrodes 20 and 26, an electric field distribution similar to one produced when the second electrode 20 is non-existent, that is, when only the third electrode 26 exists. The reason is that, in comparison with the second transparent substrate 12, the second electrode 20 and the third electrode 26 including the insulating layers 28 are so thin that the distances from the first electrode 14 to each of the individual electrodes 21a to 21e of the second electrode 20 and to the third electrode 26 can be regarded as uniform.

Figure 3:
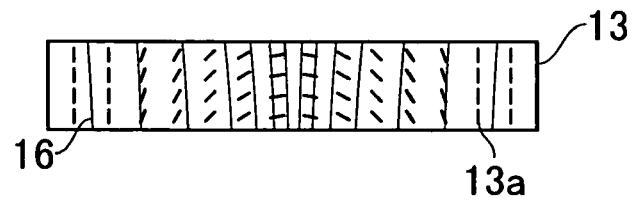
FIG. 3 is a diagram showing a cross section of a liquid crystal layer along with the electric force lines produced when the potential at a third electrode is set equal to the potential at a second electrode.

FIG. 3 shows the electric force lines 16 observed in this state. The electric force lines 16 describe curves that approach a central part of the optical element 10 as they run from the second electrode 20 side toward the first electrode 14. The electric force lines 16 re-align the liquid crystal molecules 13a in the liquid crystal layer 13 in such a way that the liquid crystal layer 13 exhibits increasingly high refractive indices toward the center axis through the holes 27. This makes the optical element 10 act as a convex lens. Here, by controlling the voltages to the second electrode 20 and the third electrode 26, it is possible to control the refractive index distribution, and thereby it is possible to control the focal length of the optical element 10 within a range restricted by the size of the hole 27 of the third electrode 26.

When the voltages are independently controlled such that the entire second electrode 20 is set at the same potential and the third electrode 26 is set at a potential lower than that at the second electrode 20, it is possible to produce an electric field distribution similar to one produced when, of the individual electrodes of the second electrode 20, only the one 21e closest to the third electrode 26 exists.

Alternatively, when the voltages are independently controlled such that the individual electrodes 21a to 21d of the second electrode 20 are set at the same potential and that the individual electrode 21e and the third electrode 26 are set at a potential lower than the just-mentioned potential, it is possible to produce an electric field distribution similar to one produced when only the individual electrode 21d exits. In similar manners, for each of the individual electrodes 21a to 21c, it is possible to produce an electric field distribution similar to one produced when it alone exits.

In any of these cases, the optical element 10 acts as a convex lens, but, from one case to another, the size of the hole 27 of the electrode that is regarded as existing varies, and accordingly the range in which the focal length can be varied varies. Thus, the optical element 10 can vary the focal length thereof in a wider range than when only one electrode having a hole is arranged to face the first electrode 14 with the liquid crystal layer 13 sandwiched in between (for example, when the second electrode 20 is nonexistent and only the third electrode 26 exists).

Moreover, by independently controlling the potentials at the second electrode 20 and at the third electrode 26, it is possible to make the optical element 10 act as a convex lens having a desired refractive index distribution. For example, by producing a refractive index distribution such that the liquid crystal layer 13 have a uniform focal length in different parts thereof from the center axis through the holes 27 to the edge, it is possible to make the optical element 10 act as a convex lens with little spherical aberration.

Figure 4:
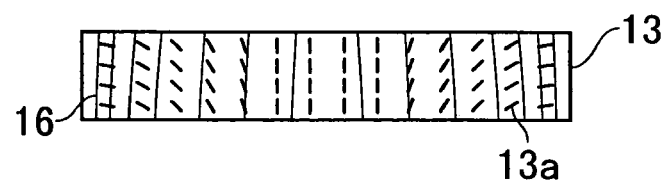
FIG. 4 is a diagram showing a cross section of a liquid crystal layer along with the electric force lines produced when the potential at a third electrode is set lower than the potential at a second electrode.

On the other hand, when the potential at the third electrode 26 is set higher than the potential at the second electrode 20, as shown in FIG. 4, there are produced electric force lines 16 that spread out toward an outer edge part of the optical element 10 as they run from the second electrode 20 side toward the first electrode 14. The electric force lines 16 re-align the liquid crystal molecules 13a in the liquid crystal layer 13 in such a way that the liquid crystal layer 13 exhibits increasingly low refractive indices toward the center axis through the holes 27. This makes the optical element 10 act as a concave lens. Also in this case, by controlling the potentials at the different electrodes in similar manners as with a convex lens, it is possible to vary the focal length of the optical element 10. Here, by properly controlling the potentials at the individual electrodes 21a to 21e of the second electrode 20 and at the third electrode 26, it is possible to make the optical element 10 act as a concave lens having a desired refractive index distribution.

The description above deals with a case where the liquid crystal molecules 13a are positively dielectric. By contrast, in a case where they are negatively dielectric, setting the potential at the third electrode 26 lower than the potential at the second electrode 20 makes the optical element 10 act as a convex lens, and setting the potential at the third electrode 26 higher than the potential at the second electrode 20 makes the optical element 10 act as a concave lens.

Thus, with the structure described above, simply through voltage control, the optical element 10 can be made to act both as a convex lens and as a concave lens. That is, the optical element 10 acts as a lens of which the focal length can be varied over a wide range encompassing both positive and negative focal lengths. Moreover, as described above, the electric field distribution produced across the liquid crystal layer 13 is free from disturbance attributable to factors such as conductors, and consequently the liquid crystal layer 13 exhibits a neat refractive index distribution that is axisymmetric about the center axis through the holes 27. Thus, the optical element 10 produces a disturbance-free image.

Figure 5:
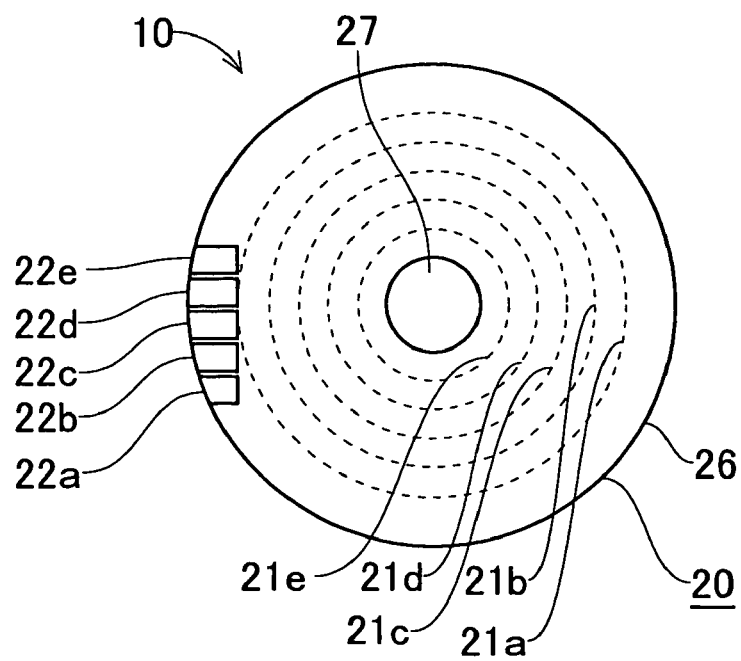
FIG. 5 is a plan view of the optical element of the first embodiment, in a case where contacts to individual electrodes are so provided as to be accessible from the top surface of a third electrode.

As a modification, as shown in FIG. 5, contacts 22a to 22e may be provided on the individual electrodes 21a to 21e, respectively, by carving out outer edge parts of the third electrode 26 so as to expose parts of the top surfaces of the individual electrodes 21a to 21e, so that the conductors 31 leading from the second electrode 20 and the third electrode 26 to the voltage applying means 30 are connected to those contacts 22a to 22e. This makes easy the fitting of the conductors 31 to the individual electrodes 21a to 21e. Incidentally, the top surface of the third electrode 26 is exposed from the beginning, and therefore any part thereof can be used as a contact, so that a conductor 31 is fitted thereto.

Figure 6:
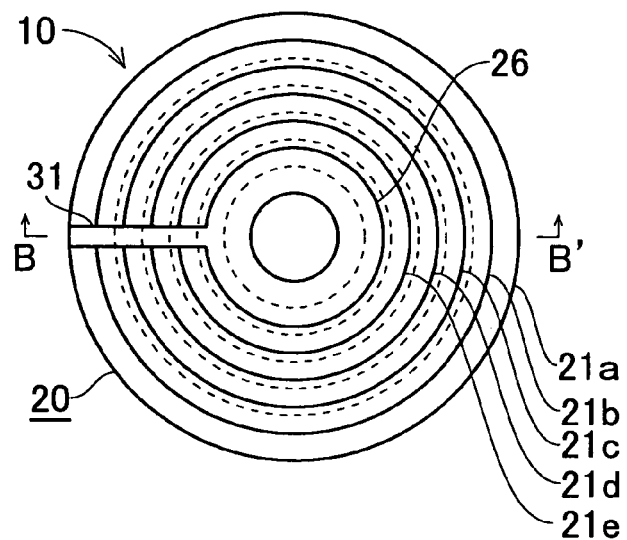
FIG. 6 is a plan view of the optical element of the first embodiment, in a case where individual electrodes and a third electrodes are made increasingly smaller away from a liquid crystal layer and where conductors overlap one another.
Figure 7:
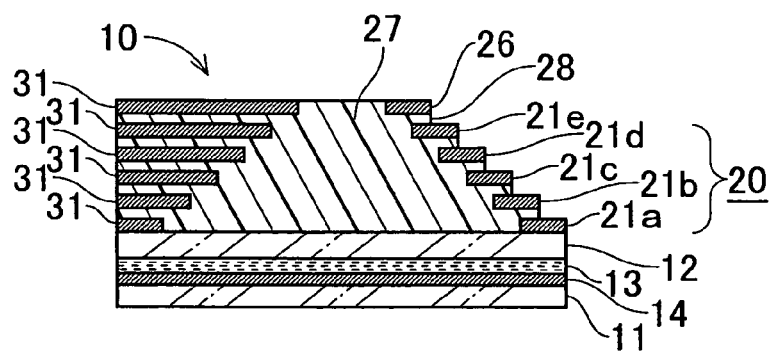
FIG. 7 is a cross-sectional view along line B-B' shown in FIG. 6 as viewed in the arrow-indicated direction.

In the first embodiment, so long as, among the individual electrodes 21a to 21e of the second electrode 20 and the third electrode 26, the sizes of the holes thereof fulfill the relationship described above, and in addition, among those electrodes, the exterior diameter of each electrode is greater than the diameter of the hole 27 of the one located adjacently on the liquid crystal layer 13 side thereof, as shown in FIGS. 6 and 7, the exterior diameters of the electrodes do not necessarily have to be equal. FIG. 6 is a plan view of another example of the optical element of the first embodiment, and FIG. 7 is a cross-sectional view thereof along line B-B' shown in FIG. 6 as viewed in the arrow-indicated direction. This structure is possible because, of the second and third electrodes 20 and 26, the parts that do not face the liquid crystal layer 13 contribute little to producing the electric field distribution between the second transparent substrate 12 and the second and third electrodes 20 and 26.

Figure 8:
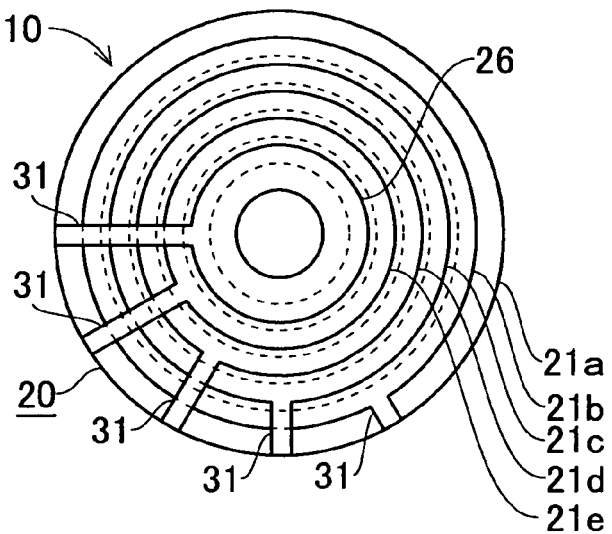
FIG. 8 is a plan view of the optical element of the first embodiment, in a case where individual electrodes and a third electrodes are made increasingly smaller away from a liquid crystal layer and where conductors do not overlap one another.

In this case, the conductors 31 are provided to run outward from the outer edges of the electrodes. These conductors, too, do not influence the electric field distribution between the first electrode 14 and the second and third electrodes 20 and 26. The reason is that, when viewed from a perspective perpendicular to the liquid crystal layer 13, the second and third electrodes 20 and 26 leave no gap among them, and thus the conductors 31 do not directly face the liquid crystal layer 13. FIG. 6 shows a case where the conductors overlap one another, and FIG. 8 shows a case where the conductors are displaced from one another. In either case, the optical element 10 acts equally.

The conductors 31 may be formed integrally with, and hence with the same material as, the second and third electrodes 20 and 26, or may be formed as conductors separate therefrom. FIGS. 6 to 8 deal with cases where the insulating layers 28 are not laid above where the individual electrodes 21a to 21e do not overlap one another; it is, however, also possible to lay the insulating layers 28 also above this no-overlap part.

Figure 9:
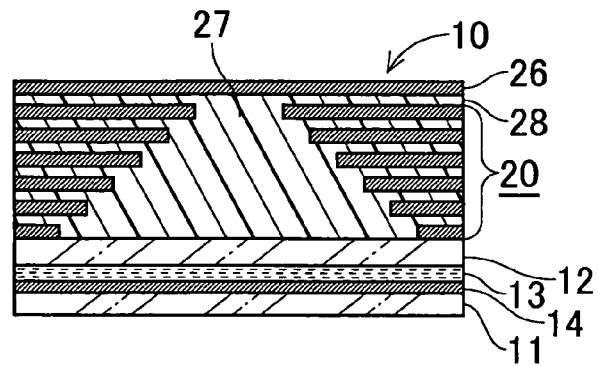
FIG. 9 is a cross-sectional view of the optical element of the first embodiment, in a case where a third electrode without a hole is provided.

In the first embodiment, as shown in FIG. 9, the third electrode 26 may have no hole. This eliminates the need to adjust the position of a hole in the third electrode 26 during the fabrication of the optical element 10, and thus makes its fabrication easier. Moreover, with no hole in the third electrode 26, the optical element 10 is less likely to be influenced by an external electric field.

FIG. 1 deals with a case where the second electrode 20 includes five individual electrodes, and FIG. 9 deals with a case where it includes six; it should be understood, however, that so long as the second electrode 20 includes at least one individual electrode, the optical element 10 can be made to act as described above.

In the first embodiment, any of the individual electrodes 21a to 21e of the second electrode 20, or the third electrode 26 when it has a hole, may be formed of a non-transparent material such as aluminum. In this case, the non-transparent electrode acts as an aperture stop of the optical element 10 (serving to shield light that would pass through the part of the liquid crystal layer 13 that is located away from the center axis through the holes 27 and that thus tends to produce spherical aberration). Thus, without complicated voltage control, the optical element 10 can be made to act as a lens with little spherical aberration.

In the first embodiment, the first and second transparent substrates 11 and 12 may each be given flat surface, or may each be built as a convex or concave lens. By using a convex or concave lens as one or both of the first and second transparent substrates 11 and 12, it is possible to shift the range in which the focal length can be varied in the positive or negative direction.

Figure 10:
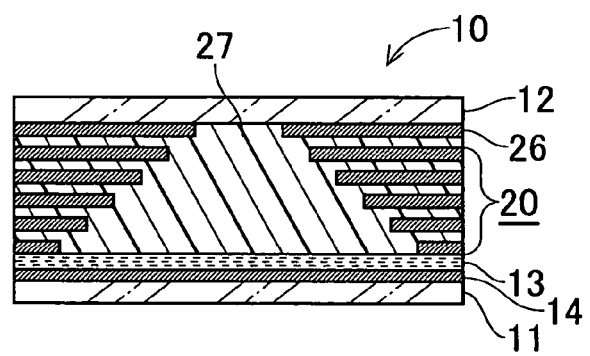
FIG. 10 is a cross-sectional view of the optical element of the first embodiment, in a case where a second transparent substrate is provided outside a third electrode.

In FIG. 1, the second and third electrodes 20 and 26 are arranged on the side of the second transparent substrate 12 facing away from the liquid crystal layer 13; as shown in FIG. 10, they may also be arranged on the side of the second transparent substrate 12 facing toward the liquid crystal layer 13. In this case, the distances from the first electrode 14 to the individual electrodes 21a to 21e of the second electrode 20 and to the third electrode 26 are shorter, and the electric force lines produced across the liquid crystal layer 13 are perpendicular to each electrode and are substantially parallel to one another. This permits the electric field distribution produced in the liquid crystal layer 13 to be controlled more independently for each of the parts of the different electrodes facing the first electrode 14. This makes it possible to use the optical element 10 not only as a convex or concave lens but also, by forming a clear concentric pattern in the liquid crystal layer 13, as a diffraction grating such as a Fresnel zone plate and for aberration correction in an optical pickup such as one for DVDs.

It should be noted that, since the individual electrodes 21a to 21e of the second electrode 20 are transparent, at least the individual electrode 21a closest to the liquid crystal layer 13 can be said to be an electrode having a transparent part within the optical path. Making a part of the individual electrode 21a located within the optical path transparent in this way helps avoid a lowering in the transmissivity of the individual electrode 21a to the light transmitted therethrough.

Second Embodiment

Figure 11:
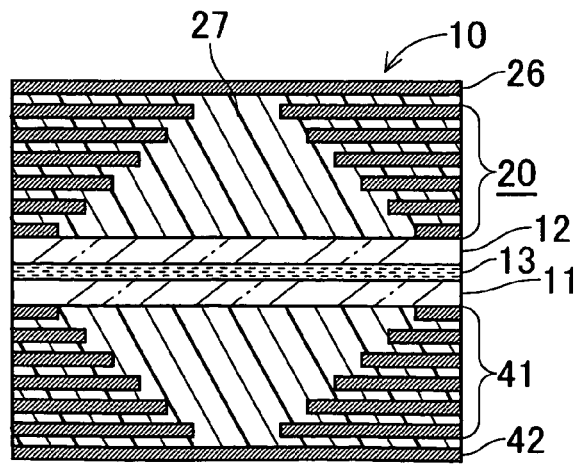
FIG. 11 is a cross-sectional view of the optical element of a second embodiment of the invention.

A second embodiment of the present invention will be described below with reference to the relevant drawings. FIG. 11 is a cross-sectional view of the optical element of the second embodiment. The second embodiment differs from the first embodiment in that, instead of the first electrode, a fourth electrode and a fifth electrode are provided; in other respects, the second embodiment is the same as the first embodiment, and therefore, in FIG. 11, such parts that find substantially equivalent parts in the first embodiment are identified by common reference numerals.

In the optical element 10 of the second embodiment, as shown in FIG. 11, on the surface of the first transparent substrate 11 facing away from the liquid crystal layer 13, a fourth electrode 41 and a fifth electrode 42 are laid that have the same structures as the second electrode 20 and the third electrode 26, respectively. It should be noted that what is referred to as a first, a second, a third, and a fourth electrode in the appended claims correspond to the fourth electrode 41, the fifth electrode 42, the second electrode 20, and the third electrode 26, respectively.

With this structure, the optical element 10 permits finer control of the electric field distribution in the liquid crystal layer 13, and thus acts both as a convex lens and as a concave lens with higher accuracy.

In the second embodiment, the fourth and fifth electrodes 41 and 42 may be laid on the surface of the first transparent substrate 11 facing toward the liquid crystal layer 13. The exterior diameters of the fourth and fifth electrodes 41 and 42, so long as they are each larger than the diameter of the hole in the electrode located adjacently on the liquid crystal layer 13 side thereof, do not necessarily have to be all equal. The fourth and fifth electrodes 41 and 42, so long as they fulfill the conditions stated previously in connection with the second and third electrodes 20 and 26 of the first embodiment, do not necessarily have to have exactly the same structures as the second and third electrodes 20 and 26, respectively.

Third Embodiment

A third embodiment of the present invention will be described below with reference to the relevant drawings. Such parts as find their counterparts in the first or second embodiment will be identified by common reference numerals, and no explanation thereof will be repeated.

First, a description will be given of the construction of an optical pickup to which the optical element 10 of each embodiment is applicable.

Figure 12:
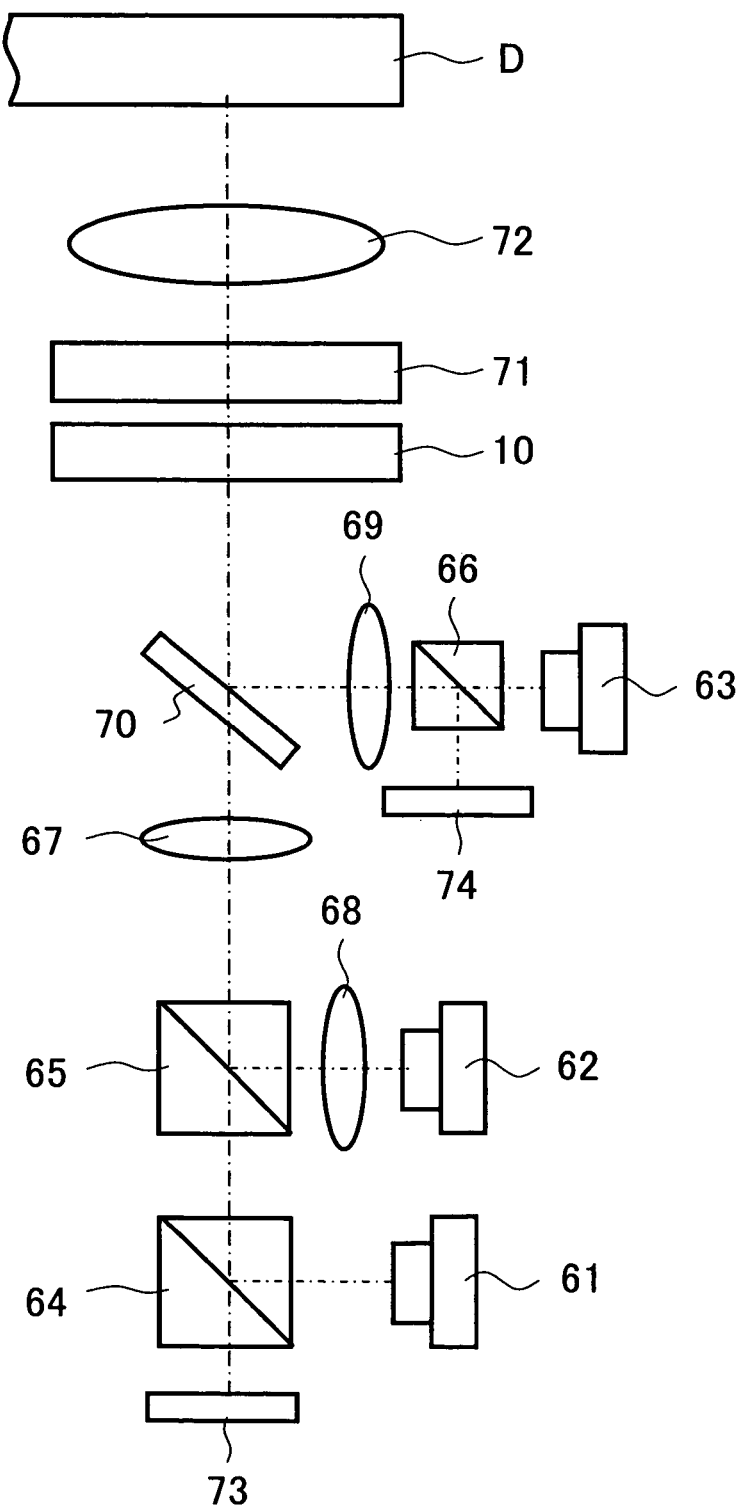
FIG. 12 is a diagram illustrating an outline of the construction of an optical pickup to which the optical element of each embodiment is applicable.

FIG. 12 is a diagram illustrating an outline of the construction of the optical pickup dealt with in this embodiment. This optical pickup is provided with: light sources 61, 62, and 63; beam splitters 64, 65, and 66; a collimator lens 67; an adjustment lens 68; a collimator lens 69; a half-mirror 70, a quarter-wave plate 71, a condenser lens (objective lens) 72; and photosensors 73 and 74. In this optical pickup, the optical element 10 is arranged in the optical path between the half-mirror 70 and the quarter-wave plate 71. The optical element 10 is designed to be capable of correcting coma, a detailed description of which will be given later.

The light sources 61, 62, and 63 are, for example, laser diodes, and emit light toward an optical disc D. In this embodiment, the light source 61 emits light of a wavelength (for example, 785 nm) corresponding to CDs; the light source 62 emits light of a wavelength (for example, 660 nm) corresponding to DVDs; and the light source 63 emits light of a wavelength (for example, 405 nm) corresponding to next-generation DVDs (such as Blu-ray discs and HD (high-definition) DVDs). Thus, it is possible to cope with, as the optical disc D, any of a CD, a DVD, and a next-generation DVD.

Any of the light sources 61, 62, and 63 may emit light of any of the wavelengths corresponding to CDs, DVDs, and next-generation DVDs. For example, the light source that emits light of the wavelength corresponding to CDs is not limited to the light source 61.

The beam splitters 64 and 65 reflect the light from the light sources 61 and 62, respectively, toward the optical disc D, and both transmit the light returning from the optical disc D. The beam splitter 66 transmits the light from the light source 63, and reflects the light returning from the optical disc D. The collimator lens 67 condenses the light (a diverging beam) from the light sources 61 and 62 to form it into a substantially parallel beam. The adjustment lens 68, working with the collimator lens 69, condenses the light from the light source 62 to form it into a substantially parallel beam. The collimator lens 69 condenses the light (a diverging beam) from the light source 63 to form it into a substantially parallel beam. The collimator lenses 67 and 69 and the adjustment lens 68 are driven to move by an unillustrated driving mechanism for the purpose of varying the position at which the light shone on the optical disc D is condensed according to the type of the optical disc D used. The half-mirror 70 transmits the light from the light sources 61 and 62 to direct it toward the optical disc D, and reflects the light from the light source 63 to direct it toward the optical disc D.

The quarter-wave plate 71 converts the light (linearly polarized) emitted from the light sources 61, 62, and 63 into circularly polarized light, and converts the light (circularly polarized) returning from the optical disc D into linearly polarized light polarized perpendicularly to the polarization direction of the light as it entered the quarter-wave plate 71 for the first time. The condenser lens 72 condenses the light that has entered it on the information recording surface of the optical disc D. The photosensors 73 and 74 sense the light returning from the optical disc D to detect, during recording to or reproduction from the optical disc D, servo signals (a focus error signal and a tracking error signal), an information signal, an aberration signal, and the like.

In the construction described above the linearly polarized light emitted from the light source 61 is reflected from the beam splitter 64, is then transmitted through the beam splitter 65, and then enters the collimator lens 67, which then converts the light into a substantially parallel beam, which is then transmitted through the half-mirror 70, and then enters the optical element 10. The linearly polarized light emitted from the light source 62 is transmitted through the adjustment lens 68, is then reflected from the beam splitter 65, and then enters the collimator lens 67. The light from the light source 62 is converted into a substantially parallel beam by the adjustment lens 68 and the collimator lens 67, is then transmitted through the half-mirror 70, and then enters the optical element 10. The linearly polarized light emitted from the light source 63 is transmitted through the beam splitter 66, is then converted into a substantially parallel beam by the collimator lens 69, is then reflected from the half-mirror 70, and then enters the optical element 10. The light that has entered the optical element 10 then has coma aberration corrected therein, then exits therefrom, is then converted into a circularly polarized light by the quarter-wave plate 71, and is then condensed on the information recording surface of the optical disc D by the condenser lens 72.

The light returning from the optical disc D passes through the condenser lens 72, is then converted by the quarter-wave plate 71 into linearly polarized light polarized perpendicularly to the polarization direction of the light as it entered the quarter-wave plate 71 for the first time, then passes through the optical element 10, and then strikes the half-mirror 70. Here, if the light returning from the optical disc D is light of the wavelength (785 nm or 660 nm) corresponding to CDs or DVDs, the returning light is transmitted through the half-mirror 70 as it is, is then transmitted through the collimator lens 67 and then through the beam splitters 65 and 64, and is sensed by the photo sensor 73, which then converts the light into an electrical signal. If the light returning from the optical disc D is light of the wavelength (405 nm) corresponding next-generation DVDs, the returning light is reflected from the half-mirror 70, is then transmitted through the collimator lens 69, is then reflected from the beam splitter 66, and is then sensed by the photo sensor 74, which then converts the light into an electrical signal.

Next, a detailed description will be given of the optical element 10. As described above, the optical element 10 of this embodiment is applicable to a system that condenses the light from the light sources 61, 62, and 63 on a recording medium to achieve recording thereto or senses the light reflected from the recording medium to read information recorded thereon. In addition, the optical element 10 of this embodiment permits correction of coma resulting from a warp or inclination in the recording medium. More specifically, the optical element 10 is structured as described below.

Figure 13A:
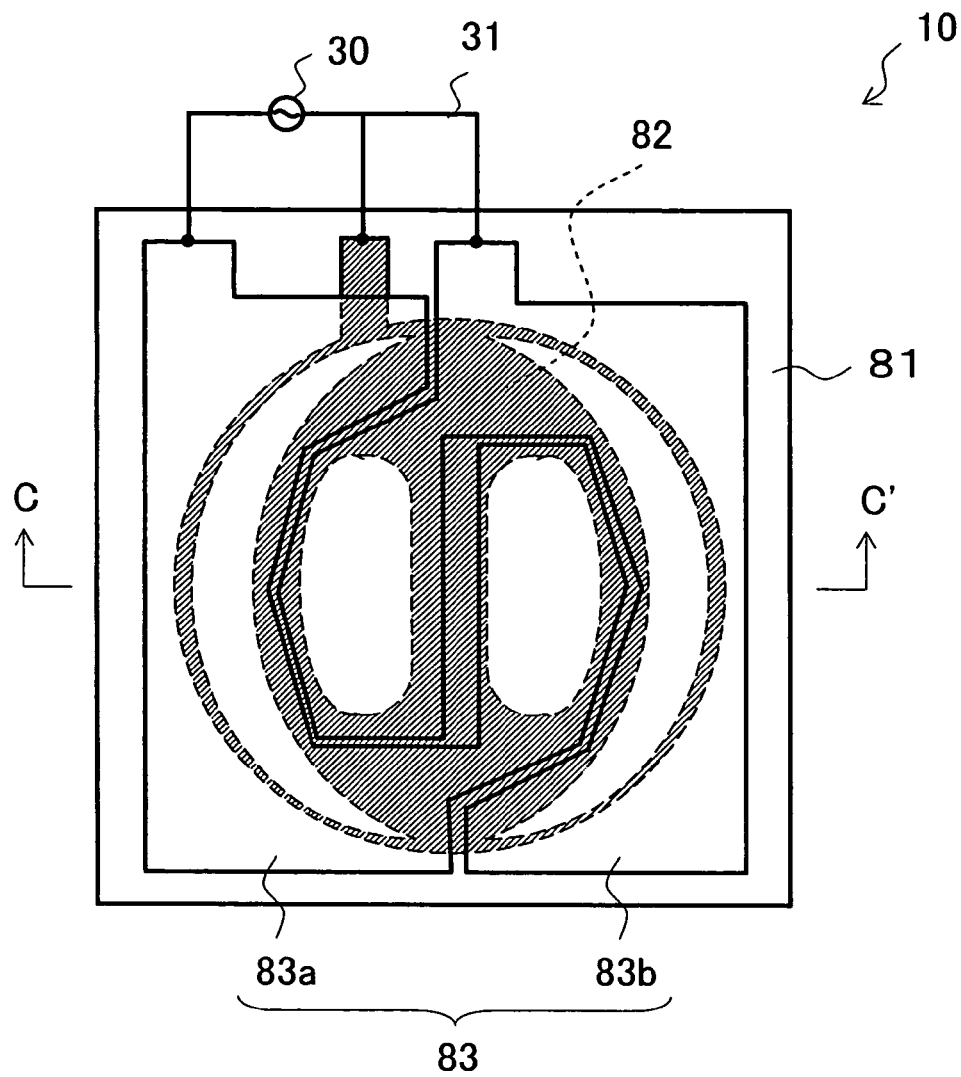
FIG. 13A is a plan view showing an outline of the structure of the optical element of a third embodiment of the present invention.
Figure 13B:
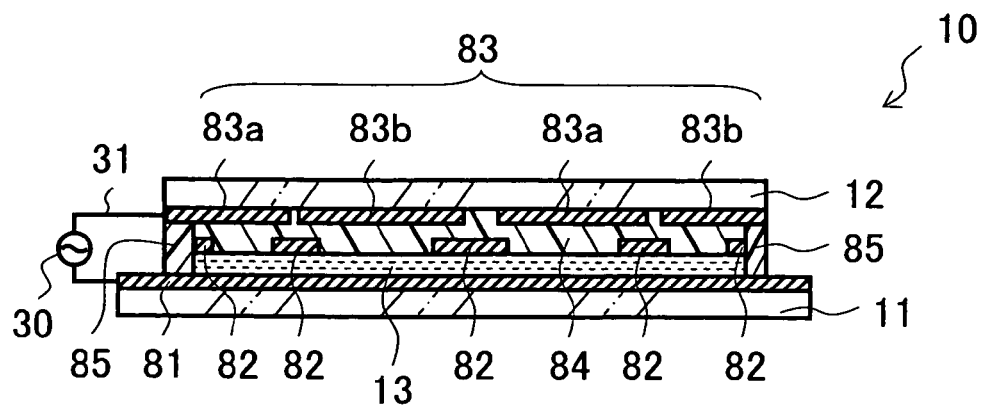
FIG. 13B is a cross-sectional view along line C-C' shown in FIG. 13A as viewed in the arrow-indicated direction.

FIG. 13A is a plan view showing an outline of the structure of the optical element 10 of this embodiment, and FIG. 13B is a cross-sectional view thereof along line C-C' shown in FIG. 13A as viewed in the arrow-indicated direction. It should be noted that, in FIG. 13A, a second transparent substrate 12 is omitted from illustration. The optical element 10 of this embodiment has a liquid crystal layer 13 sandwiched between a first transparent substrate 11 and a second transparent substrate 12.

On the liquid crystal layer 13 side of the first transparent substrate 11, an electrode 81 is formed over the entire substrate. On the liquid crystal layer 13 side of the second transparent substrate 12, electrodes 82 and 83 are formed in this order from the liquid crystal layer 13 side. The electrodes 82 and 83 are formed of, for example, a transparent substance such as ITO (indium tin oxide), and each form a plurality of individual electrodes. The electrode 83 is formed on the second transparent substrate 12, and apart from the liquid crystal layer 13 with the electrode 82 and an insulating layer 84 laid in between. The insulating layer 84 is formed of for example, a silicon nitride ($Si_3N_4$), silicon oxide ($SiO_2$), or polyimide. The electrodes 81, 82, and 83 are connected, via conductors 31, to voltage applying means 30. The voltage applying means 30 functions as a voltage applier that varies the alignment of the liquid crystal molecules in the liquid crystal layer 13 through application of voltages to the electrodes 81, 82, and 83.

The liquid crystal layer 13 is sealed in with a sealing member 85. The electrode 82 and the insulating layer 84 are, along with the liquid crystal layer 13, formed inside the sealing member 85, that is, within the area where the liquid crystal layer 13 is formed. By contrast, the electrode 83 is so formed that a part thereof protrudes out of the area where the liquid crystal layer 13 is formed and faces the sealing member 85.

As described above, the optical element 10 of this embodiment is provided with a liquid crystal layer 13, transparent substrates (a first transparent substrate 11 and a second transparent substrate 12) arranged one on each side of the liquid crystal layer 13, and electrodes (electrodes 81, 82, and 83) arranged one or two on each side of the liquid crystal layer 13, wherein, through application of voltages to the electrodes by voltage applying means 30, the alignment of the liquid crystal molecules in the liquid crystal layer 13 is varied. Moreover, the electrodes on one side (the second transparent substrate 12 side) of the liquid crystal layer 13 are composed of a plurality of individual electrodes (electrodes 82 and 83) laid on each other with an insulating layer 84 laid in between.

Figure 14A:
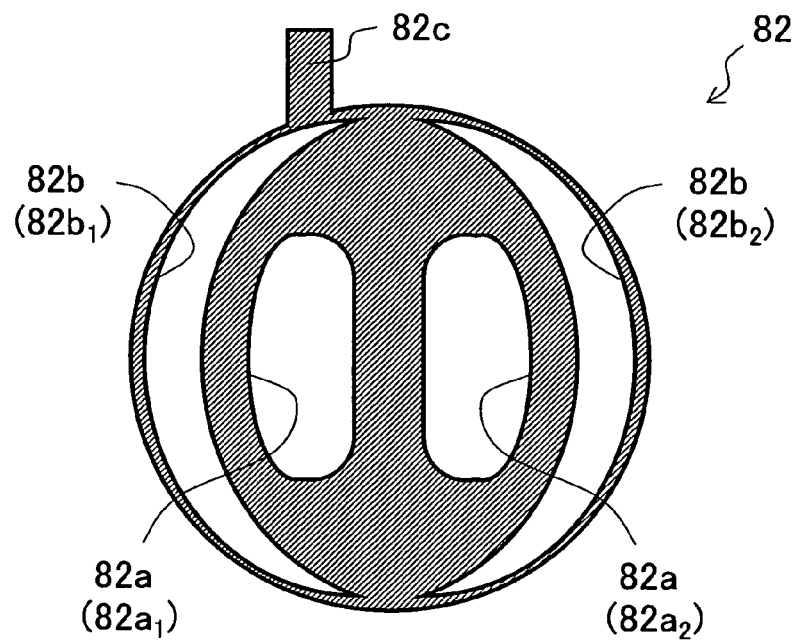
FIG. 14A is a plan view showing an outline of the structure of the individual electrode closest to a liquid crystal layer in the optical element.

Next, a detailed description will be given of the electrodes 82 and 83. FIG. 14A is a plan view showing an outline of the structure of the electrode 82. The electrode 82 is, among the plurality of individual electrodes, the one closest to the liquid crystal layer 13 (in the first layer from the liquid crystal layer 13 side), and is formed continuous within the optical path. That is, the electrode 82 neither is divided into a plurality of electrodes nor has insular electrodes within the optical path. Then viewed from a perspective perpendicular to the liquid crystal layer 13, the electrode 82 has the outer edge thereof encircling an area larger than the area where the light beam passes. The electrode 82 has a transparent part within the optical path. This helps avoid a lowering of the transmissivity of the electrode 82 to the light transmitted therethrough.

Moreover, the electrode 82 has holes 82a and 82b (first holes), two of each, within the optical path. The holes 82a and 82b are formed in positions corresponding to the peaks of coma. That is, the electrode 82 is not formed where large coma occurs.

The holes 82a are longitudinally elongate, and are composed of two holes $82a_1$ and $82a_2$. The holes $82a_1$ and $82a_2$ are arranged side by side, with the optical axis at the center between them. On the other hand, the holes 82b are crescent-shaped, and are composed of two holes $82b_1$ and $82b_2$. The hole $82_1$ is formed, with the concave part thereof facing inward (toward the optical axis), outside the hole $82a_1$ (on the side thereof facing away from the optical axis). The hole $82b_2$ is formed, with the concave part thereof facing inward, outside the hole $82a_2$. Thus, of the two pairs of holes 82a and 82b, the holes $82a_1$ and $82b_1$ and the holes $82a_2$ and $82b_2$ are formed in positions line-symmetric, and also point-symmetric about the optical axis, in the electrode 82.

The electrode 82 also has a part thereof protruding out of the optical path to form a lead portion 82c. To this lead portion 82c, a conductor 31 leading to the voltage applying means 30 is connected.

Figure 14B:
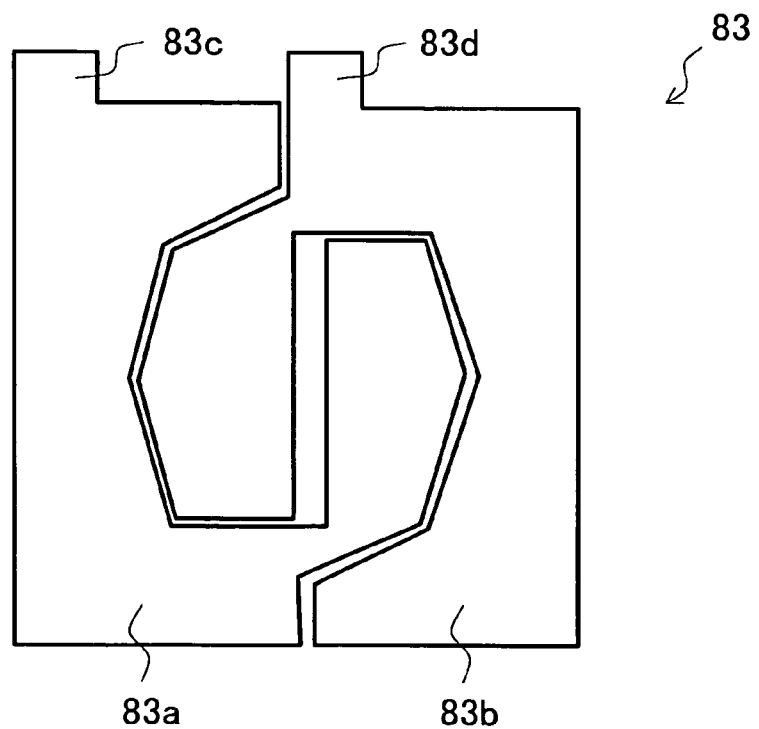
FIG. 14B is a plan view showing an outline of the structure of the individual electrode farthest from a liquid crystal layer in the optical element

FIG. 14B is a plan view showing an outline of the structure of the electrode 83. The electrode 83 is, among the plurality of individual electrodes, the one farthest from the liquid crystal layer 13, and is composed of a plurality of electrodes (electrode segments) 83a and 83b formed in the same layer. The electrodes 83a and 83b are each formed substantially in the shape of a ring having a part thereof cut out, and are arranged so as to mesh with each other without touching each other.

Moreover, the electrodes 83a and 83b are so formed as to cover the holes 82a and 82b of the electrode 82 shown in FIG. 14A. More specifically, the electrode 83a is formed continuous so as to cover the holes $82a_2$ and $82b_1$ of the electrode 82, and the electrode 83b is formed continuous so as to cover the holes $82a_1$ and $82b_2$ of the electrode 82.

Moreover, the electrodes 83a and 83b have parts thereof protruding out of the optical path to form lead portions 83c and 83d, respectively. To these lead portions 83c and 83d, conductors 31 leading to the voltage applying means 30 are connected.

Figure 15:
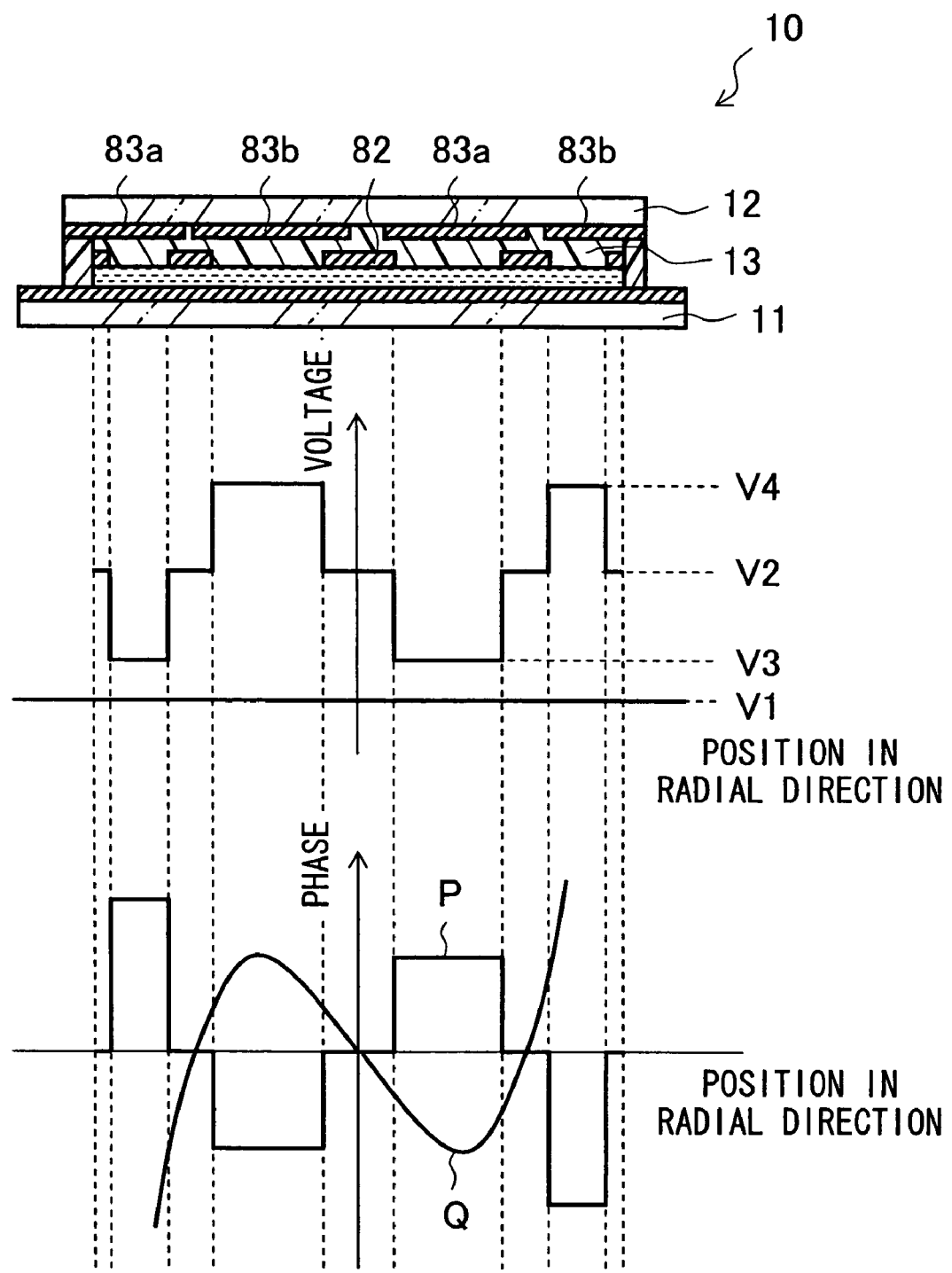
FIG. 15 is a diagram illustrating the voltages applied to different electrodes of the optical element, the phase of the light transmitted through the liquid crystal layer thereof, and the coma observed.

Next, a description will be given of the voltage control in the optical element 10 structured as described above. FIG. 15 shows the voltages applied to the different electrodes of the optical element 10, the phase of the light (solid line P) transmitted through the liquid crystal layer 13, and the coma observed (solid line Q). In a case where the liquid crystal molecules of the liquid crystal layer 13 are negatively dielectric, that is, in a case where the value (dielectric anisotropy) calculated by subtracting the dielectric constant observed when a voltage is applied along the minor axis of the molecules from the dielectric constant observed when a voltage is applied along the major axis of the molecule is negative, when voltages V1, V2, V3, and V4 (where V1<V3<V2<V4) are applied to the electrodes 81, 82, 83a, and 8b, respectively, the alignment of the liquid crystal molecules in the liquid crystal layer 13 changes to vary the refractive index of the liquid crystal layer 13 in such a way as to produce a phase pattern as indicated by solid line P in the transmitted light. This phase pattern is roughly an inversion of the pattern of coma indicated by solid line Q. Thus, through application of voltages to the different electrodes, it is possible to vary the refractive index of the liquid crystal layer 13 and thereby control the phase of the transmitted light so as to correct the coma produced through the optical system. In a case where the liquid crystal molecules of the liquid crystal layer 13 are positively dielectric, the voltages applied have a pattern inverted as compared with the one shown in the figure.

As described above, in this embodiment, the electrode 82, that is the individual electrode closest to the liquid crystal layer 13, is formed continuous within the optical path. This makes it possible, as in this embodiment, to form part of the electrode 82 into a lead portion 82c so that the conductor 31 connected to the lead portion 82c is located outside the optical path. This helps eliminate the influence of the conductor 31 on the electric field distribution in the liquid crystal layer 13 and thereby obtain an ideal electric field distribution in the liquid crystal layer 13. Thus, it is possible to avoid degradation of the characteristics of the optical element 10 attributable to the conductor 31. Moreover, the electrode 82 is formed to have holes 82a and 82b, and thus, according to where the holes 82a and 82b are formed, the electric field distribution can be varied to correct coma.

In particular, in this embodiment, the holes 82a and 82b of the electrode 82 are formed in positions corresponding to the peaks of coma. This makes it possible to correct coma without laying, in the optical path, conductors leading to insular electrodes formed in such positions as conventionally practiced.

Also in the first and second embodiment described previously, the individual electrode 21a (see FIG. 2 etc.) closest to the liquid crystal layer 13 is formed to be continuous within the optical path and to have a hole 27 within the optical path.

With this structure, as described previously, by controlling the voltages applied to the different electrodes, it is possible, without laying conductors 31 within the optical path, to give the liquid crystal layer 13 a capability to vary the focal length to act as a lens or a capability to correct aberration (for example, spherical aberration).

To sum up, to eliminate the influence of conductors on the electric field distribution and to make correction of aberration possible, the individual electrode closest to the liquid crystal layer needs to be formed so as to be continuous within the optical path and to have a hole within the optical path.

Moreover, in this embodiment, the electrode 83 is so formed as to cover the holes 82a and 82b of the electrode 82, and thus, along the optical axis, at least one of the electrodes 82 and 83 exists. Thus, by applying voltages to the electrode 81, which is formed over the entire surface of the first transparent substrate 11, and to the electrodes 82 and 83, it is possible, over the entire area of the liquid crystal layer 13, to properly control the refractive index of the liquid crystal layer 13 to control the phase of the transmitted light.

Moreover, the electrode 83 is composed of a plurality of electrodes (electrode segments) 83a and 83b laid in the same layer. Thus, it is possible, as in this embodiment, to apply different voltages V3 and V4 to the electrodes 83a and 83b. This makes it possible, in the liquid crystal layer 13, to make different the phase of the transmitted light between in the area where the electrodes 83a and 81 face each other through the holes 82a and 82b of the electrode 82 and in the area where the electrodes 83b and 81 face each other through the holes 82a and 82b of the electrode 82. This makes it possible to correct coma properly.

Fourth Embodiment

A fourth embodiment of the present invention will be described below with reference to the relevant drawings. Such parts as find their counterparts in any of the first to third embodiments will be identified by common reference numerals, and no explanation thereof will be repeated.

Figure 16A:
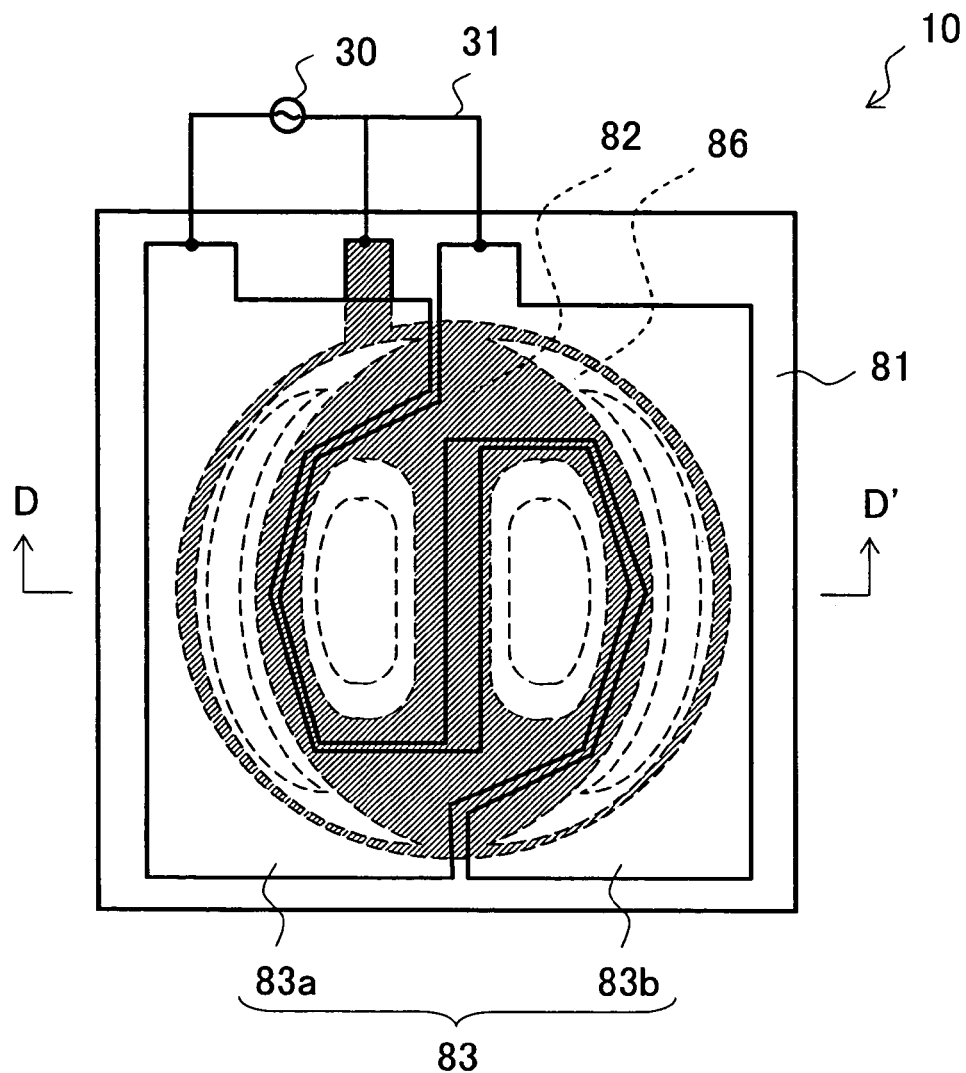
FIG. 16A is a plan view showing an outline of the structure of the optical element of a fourth embodiment of the present invention.
Figure 16B:
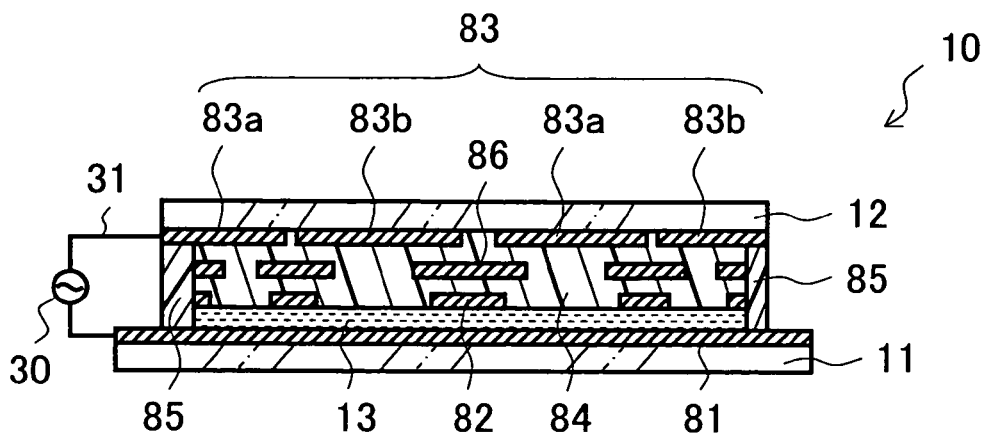
FIG. 16B is a cross-sectional view along line D-D' shown in FIG. 16A as viewed in the arrow-indicated direction.

FIG. 16A is a plan view showing an outline of the structure of the optical element 10 of this embodiment and FIG. 16B is a cross-sectional view thereof along line D-D' shown in FIG. 16A as viewed in the arrow-indicated direction. It should be noted that, in FIG. 16A, a second transparent substrate 12 is omitted from illustration. The optical element 10 of this embodiment has the same structure as that of the third embodiment except that, on the second transparent substrate 12 side of the liquid crystal layer 13, in addition to the electrodes 82 and 83, an electrode 86 is also arranged that is connected to a conductor 31.

The electrode 86 is, among the plurality of individual electrodes laid on the second transparent substrate 12 side of the liquid crystal layer 13, the individual electrode in the second layer from the liquid crystal layer 13 side. That is, the electrode 86 is laid between the electrode 82 and the electrode 83. The electrode 86 is formed of, for example, a transparent material such as ITO, and is formed apart from the electrodes 82 and 83 and from the liquid crystal layer 13 with insulating layers 84 laid in between.

Figure 17:
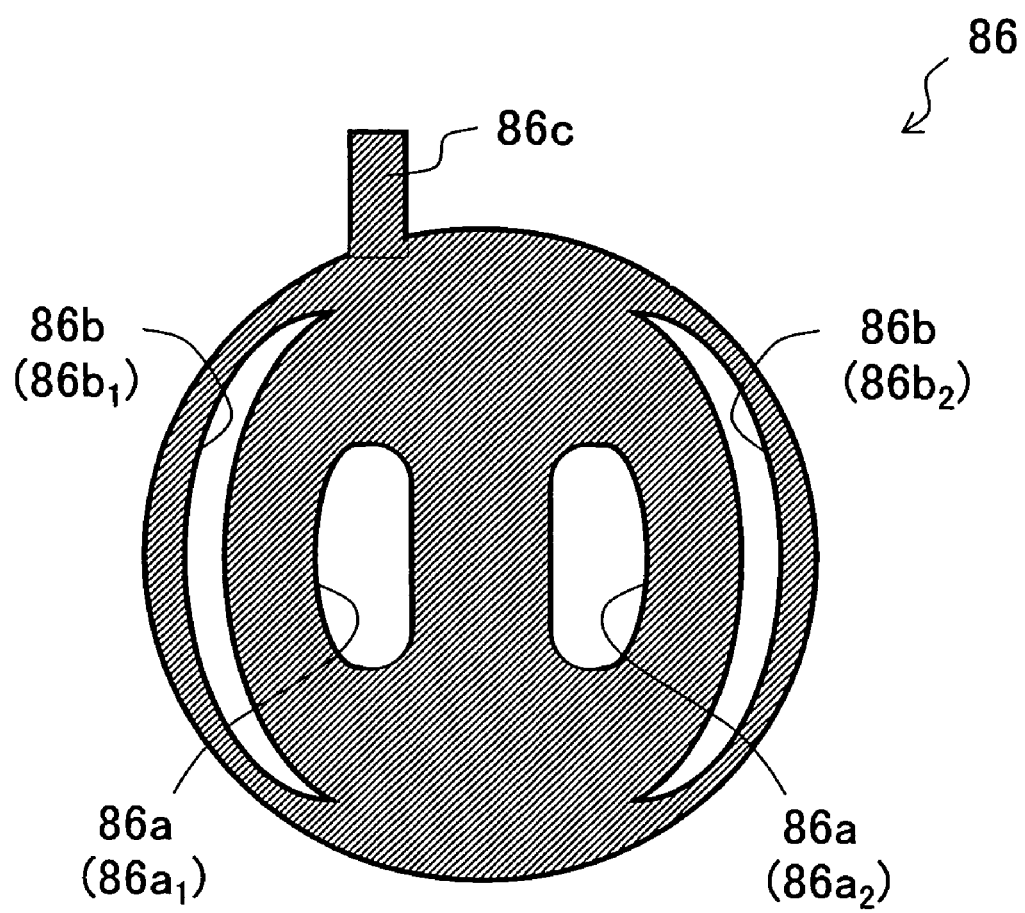
FIG. 17 is a plan view showing an outline of the structure of the second individual electrode as counted from a liquid crystal layer in the optical element.

FIG. 17 is a plan view showing an outline of the structure of the electrode 86. Like the electrode 82, the electrode 86 is formed continuous within the optical path, and is so formed that, when viewed from a perspective perpendicular to the liquid crystal layer 13, the outer edge thereof encircles and area larger than the area where the light beam passes.

Moreover, the electrode 86 has holes 86a and 86b (second holes), two of each, within the optical path. The holes 86a and

86b are formed in positions corresponding to the peaks of coma. That is, the electrode 86 is not formed where large coma occurs.

The holes 86a are longitudinally elongate, and are composed of two holes 86a$_1$ and 86a$_2$. The holes 86a$_1$ and 86a$_2$ are arranged side by side, with the optical axis at the center between them. On the other hand, the holes 86b are crescent-shaped, and are composed of two holes 86b$_1$ and 86b$_2$. The hole 86b$_1$ is formed, with the concave part thereof facing inward, outside the hole 86a$_1$. The hole 86b$_2$ is formed, with the concave part thereof facing inward, outside the hole 86a$_2$. Thus, of the two pairs of holes 86a and 86b, the holes 86a$_1$ and 86b$_1$ and the holes 86a$_2$ and 86b$_2$ are formed in positions line-symmetric, and also point-symmetric about the optical axis, in the electrode 86.

The holes 86a and 86b of the electrode 86 are formed smaller than the holes 82a and 82b of the electrode 82. More specifically, the holes 86a$_1$ and 86a$_2$ are formed smaller than the holes 82a$_1$ and 82a$_2$, respectively, and the holes 86b$_1$ and 86b$_2$ are formed smaller than the holes 82b$_1$ and 82b$_2$, respectively. Moreover, the holes 86a and 86b of the electrode 86 are so formed that the rims thereof lie inside the rims of the holes 82a and 82b of the electrode 82.

The electrode 86 has a part thereof protruding out of the optical path to form a lead portion 86c. To this lead portion 86c, a conductor 31 leading to the voltage applying means 30 is connected.

Figure 18:
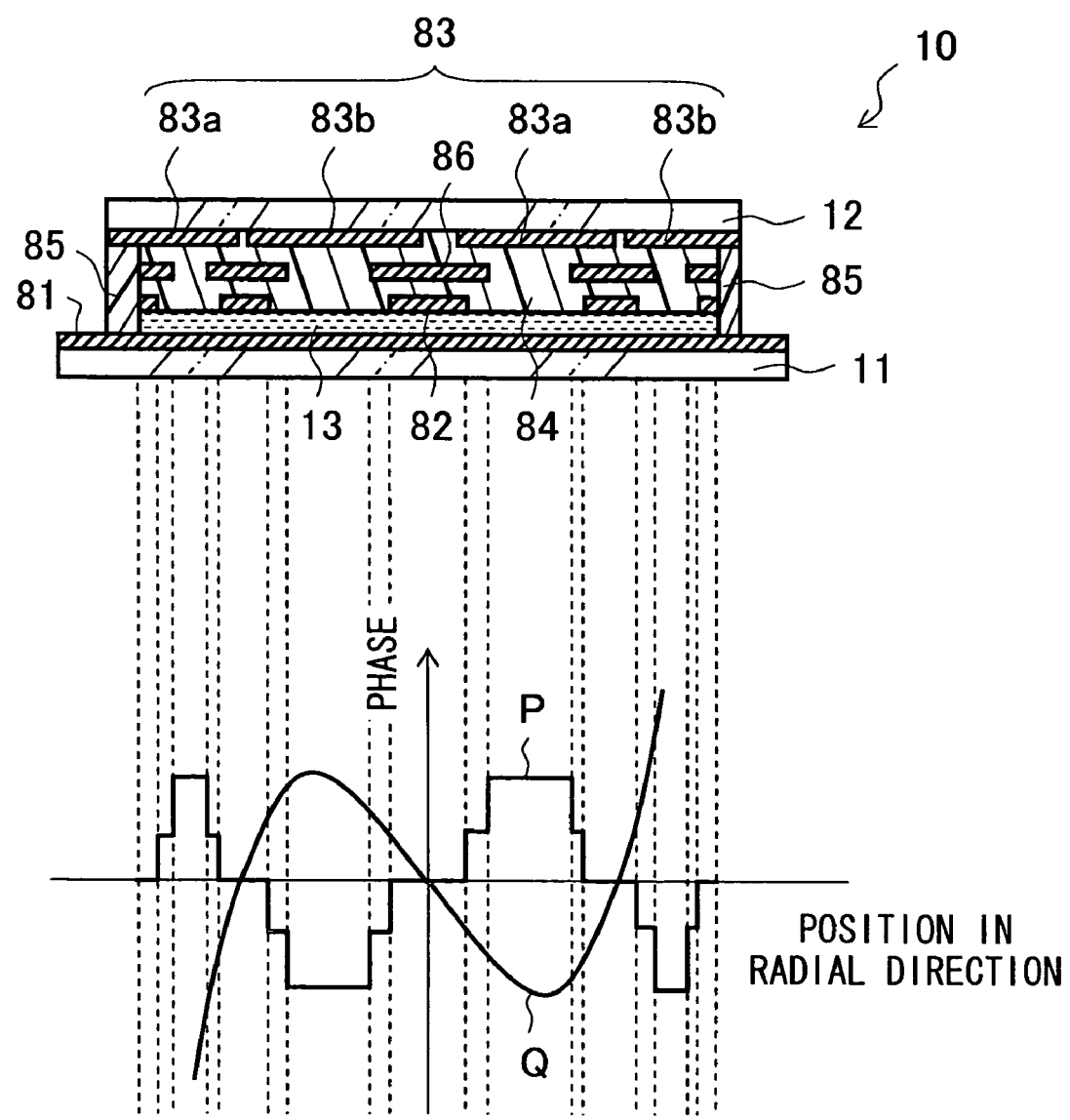
FIG. 18 is a diagram illustrating the phase of the light transmitted through the liquid crystal layer of the optical element and the coma observed.

In this embodiment, an electrode 86 is arranged as an individual electrode in the second layer from the liquid crystal layer 13 side so that, through application of adequate voltages to the different electrodes 81, 82, 86, and 83, the electric field distribution in the liquid crystal layer 13 can be controlled more finely than in the third embodiment. This makes it possible, as shown in FIG. 18, to control the phase pattern of the light transmitted through the liquid crystal layer 13 stepwise as indicated by solid line P, and thereby to make the phase pattern closer to a phase pattern inverted as compared with the pattern of coma indicated by solid line Q. As a result, it is possible to correct coma finely and hence properly.

This embodiment deals with a case where, on the second transparent substrate 12 side of the liquid crystal layer 13, three electrodes 82, 86, and 83 are formed, that is a plurality of individual electrodes are formed in three layers; it is, however, also possible to form them in four or more layers. Specifically, let the number of layers of individual electrodes arranged on the second transparent substrate 12 side of the liquid crystal layer 13 be n (where n is a natural number equal to or greater than 3). Then, by forming the individual electrodes in the first to (n−1)th layers each continuous within the optical path and having holes, moreover forming the holes in positions corresponding to the peaks of coma, and moreover forming the holes of, of every two adjacent individual electrodes, the one farther from the liquid crystal layer 13 smaller than the holes of the one closer to the liquid crystal layer 13, it is possible to correct coma finely and hence properly.

In a case where a plurality of individual electrodes are laid in three or more layers, when, except the individual electrode farthest from the liquid crystal layer 13 (that is, the individual electrode in the nth layer from the liquid crystal layer 13 side), the rest of the individual electrodes (that is, the individual electrodes in the first to (n−1)th layers from the liquid crystal layer 13 side) are each so formed as to be continuous within the optical path and to have holes within the optical path, there is no need to lay, within the optical path, conductors for applying voltages to the individual electrodes. Thus, it is possible to eliminate the influence of the conductors on the electric field distribution. Here, when the holes of the individual electrodes other than the one farthest from the liquid crystal layer 13 are formed increasingly small away from the liquid crystal layer 13, it is possible to control the electric field distribution in the liquid crystal layer 13 finely.

Fifth Embodiment

A fifth embodiment of the present invention will be described below with reference to the relevant drawings. Such parts as find their counterparts in any of the first to fourth embodiments will be identified by common reference numerals, and no explanation thereof will be repeated.

Figure 19A:
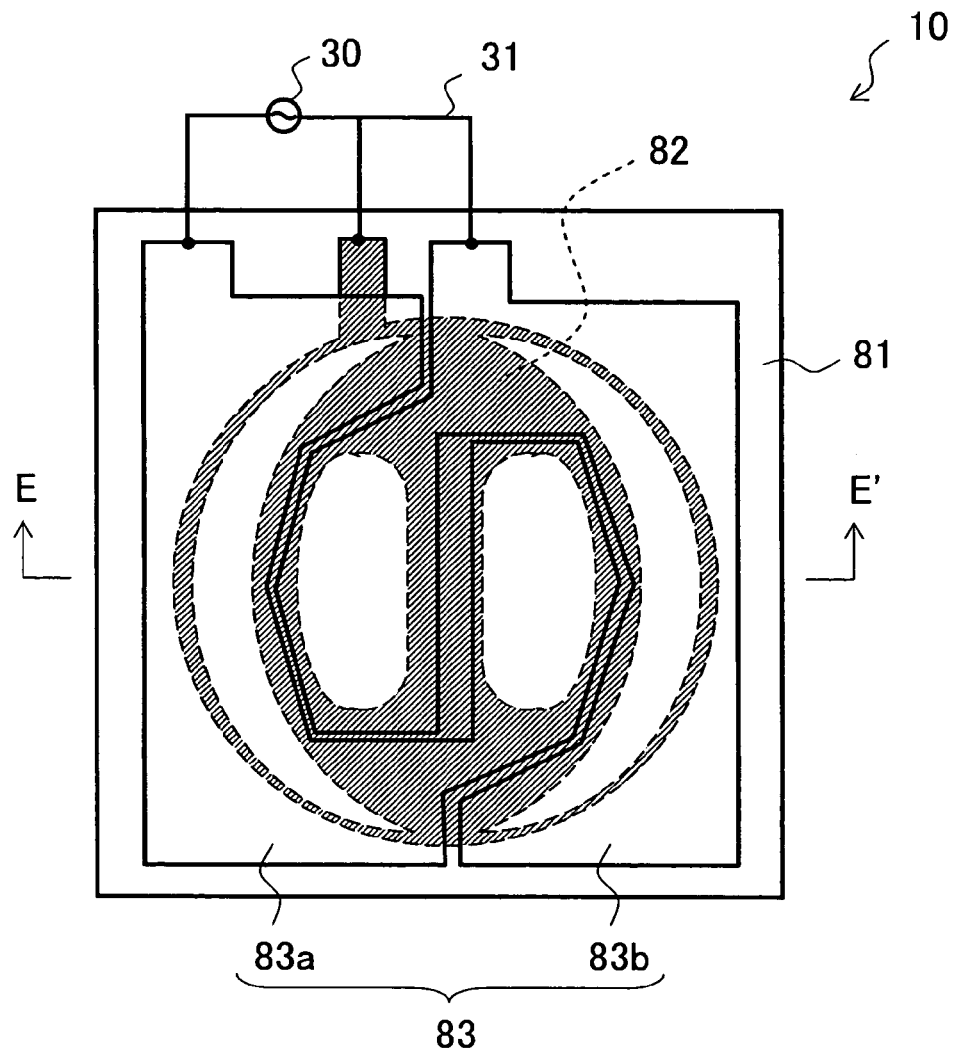
FIG. 19A is a plan view showing an outline of the structure of the optical element of a fifth embodiment of the present invention.
Figure 19B:
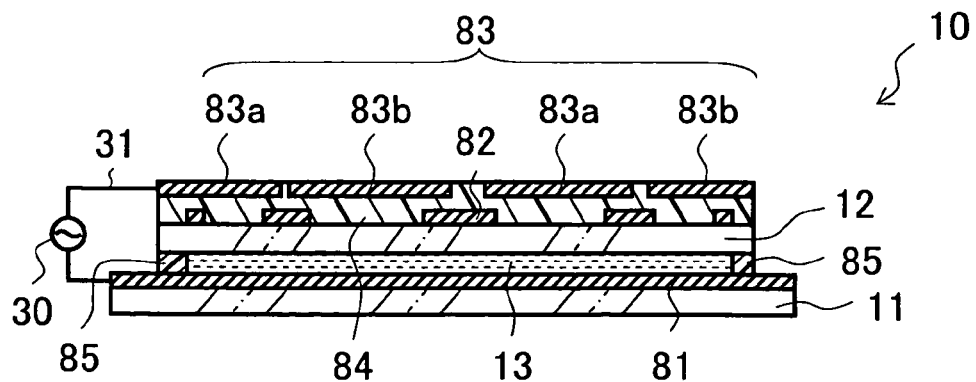
FIG. 19B is a cross-sectional view along line E-E' shown in FIG. 19A as viewed in the arrow-indicated direction.

FIG. 19A is a plan view showing an outline of the structure of the optical element 10 of this embodiment, and FIG. 19B is a cross-sectional view thereof along line E-E' shown in FIG. 19A as viewed in the arrow-indicated direction. The optical element 10 of this embodiment has the same structure as that of the third embodiment except that a plurality of individual electrodes, namely electrodes 82 and 83, are formed on the side of the second transparent substrate 12 facing away from the liquid crystal layer 13. That is, in this embodiment, the electrode 82 is formed on the surface of the second transparent substrate 12 facing away from the liquid crystal layer 13, and the electrode 83 is formed apart from the electrode 82 and the second transparent substrate 12 with an insulating layer 84 laid in between.

Figure 20:
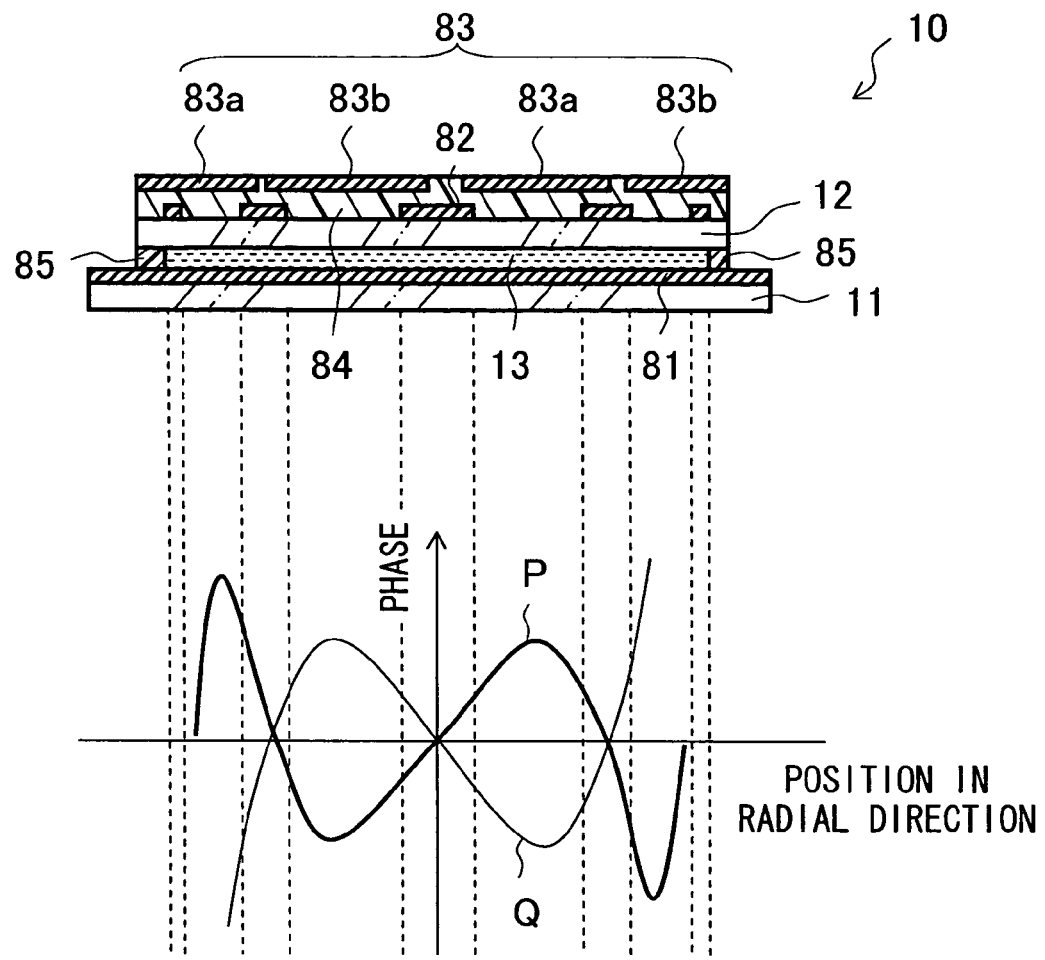
FIG. 20 is a diagram illustrating the phase of the light transmitted through the liquid crystal layer of the optical element and the coma observed.

In this structure, between the liquid crystal layer 13 and the electrodes 82 and 83, the second transparent substrate 12, which is a comparatively thick insulating member, is located. This makes it possible to produce an electric field distribution smoothly not only in the part of the liquid crystal layer 13 directly facing the electrode 82 but also over a wide area in the liquid crystal layer 13. As a result, as indicated by solid line P in FIG. 20, it is possible to vary the refractive index distribution continuously over a wide area in the liquid crystal layer 13, and thereby to correct coma, as indicated by solid line Q, smoothly.

Figure 21:
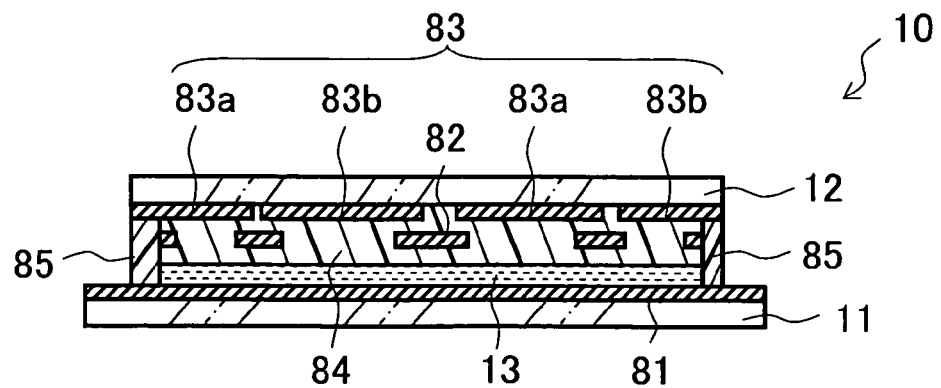
FIG. 21 is a cross-sectional view showing another example of the structure of the optical element.

FIG. 21 is a cross-sectional view showing another example of the structure of the optical element 10 of this embodiment. In this optical element 10, a plurality of individual electrodes, namely electrodes 82 and 83, are formed on the liquid crystal layer 13 side of the second transparent substrate 12, and in addition, not only the electrode 83, but also the electrode 82 is formed apart from the liquid crystal layer 13 with an insulating layer 84 laid in between. In these respects, this example differs from the third embodiment.

In this structure, between the liquid crystal layer 13 and the electrodes 82 and 83, the insulating layer 84, which is a comparatively thick insulating member, is located. Thus, as with the optical element 10 shown in FIG. 20, it is possible to produce an electric field distribution smoothly over a wide area in the liquid crystal layer 13. Thus, just as described above, it is possible to vary the refractive index distribution continuously over a wide area in the liquid crystal layer 13, and thereby to correct coma smoothly.

In addition, forming the insulating layer 84 between the liquid crystal layer 13 and the electrodes 82 and 83 makes it easier to reduce the thickness than arranging a substrate formed of, for example, glass between the liquid crystal layer 13 and the electrodes 82 and 83.

Sixth Embodiment

A sixth embodiment of the present invention will be described below with reference to the relevant drawings. Such parts as find their counterparts in any of the first to fifth embodiments will be identified by common reference numerals, and no explanation thereof will be repeated.

Figure 22A:
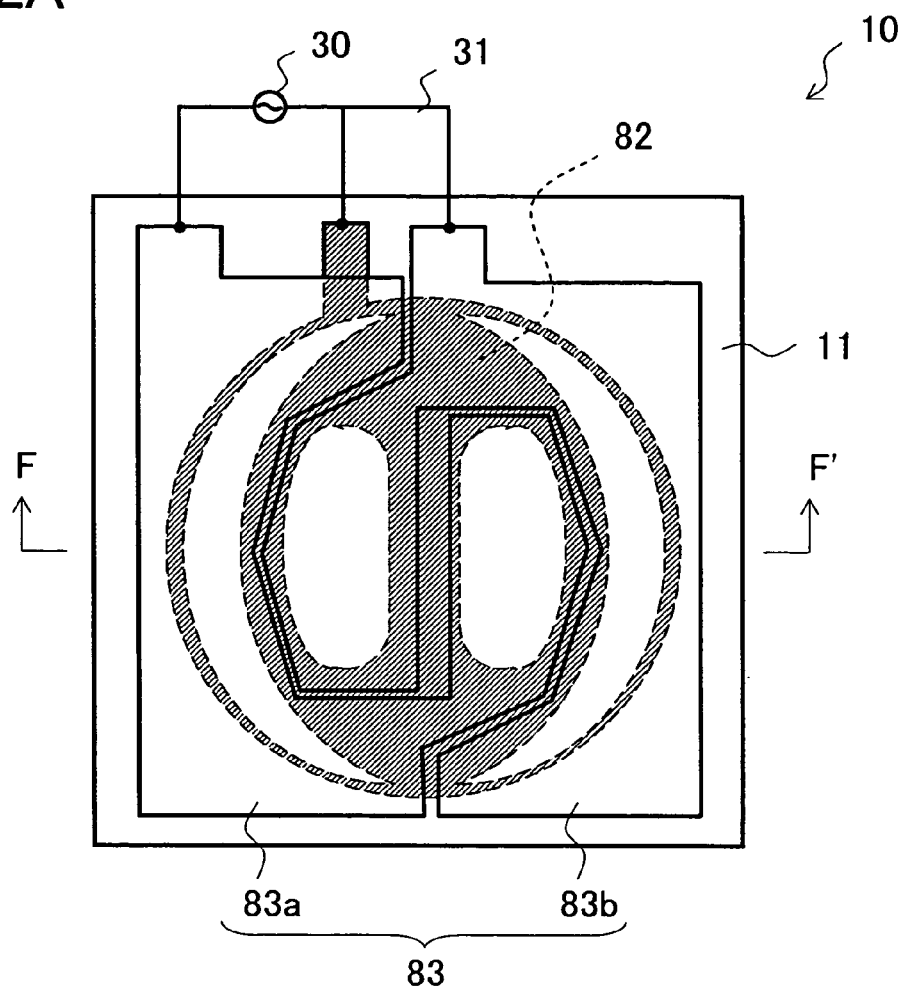
FIG. 22A is a plan view showing an outline of the structure of the optical element of a sixth embodiment of the present invention.
Figure 22B:
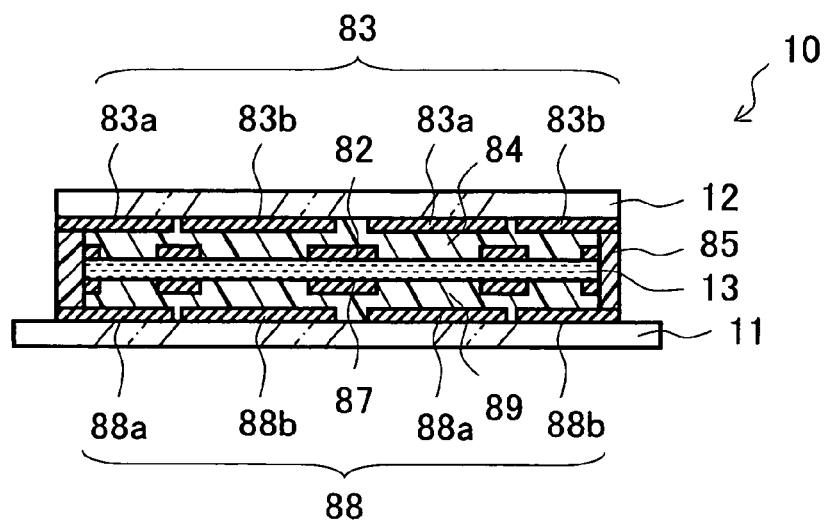
FIG. 22B is a cross-sectional view along line F-F' shown in FIG. 22A as viewed in the arrow-indicated direction.

FIG. 22A is a plan view showing an outline of the structure of the optical element 10 of this embodiment, and FIG. 22B is a cross-sectional view thereof along line F-F' shown in FIG. 22A as viewed in the arrow-indicated direction. In the optical element 10 of this embodiment, the electrode pattern on the first transparent substrate 11 side of the liquid crystal layer 13 and the electrode pattern on the second transparent substrate 12 side of the liquid crystal layer 13 is symmetric with each other about the liquid crystal layer 13.

In this embodiment, the electrode pattern on the second transparent substrate 12 side of the liquid crystal layer 13 is, for example, the same as the electrode pattern described previously in connection with the third embodiment. Accordingly, the electrode pattern on the first transparent substrate 11 side of the liquid crystal layer 13 are, for example, as follows.

On the liquid crystal layer 13 side of the first transparent substrate 11, electrodes 87 and 88 are formed in this order from the liquid crystal layer 13 side. These electrodes 87 and 88 correspond to the electrodes 82 and 83, and are formed in the same shapes as the electrodes 82 and 83. Accordingly, the electrode 87 has holes corresponding to the holes 82a and 82b of the electrode 82, and has a part thereof protruding to form a lead portion to which a conductor 31 leading to the voltage applying means 30 is connected. On the other hand, the electrode 88 is composed of electrodes 88a and 88b corresponding to the electrodes 83a and 83b, and has a part thereof protruding to form a lead portion to which a conductor 31 leading to the voltage applying means 30 is connected. The electrodes 87 and 88 are arranged symmetrically with the electrodes 82 and 83 about the liquid crystal layer 13.

The electrode 88 is formed on the first transparent substrate 11, and apart from the liquid crystal layer 13 with the electrode 87 and an insulating layer 89 laid in between. The insulating layer 89 can be formed of the same material as the insulating layer 84. The second transparent substrate 12 side electrodes 82 and 83 and the first transparent substrate 11 side electrodes 87 and 88 are connected via conductors 31 to the voltage applying means 30.

The electrode 87 and the insulating layer 89 are, along with the liquid crystal layer 13, formed inside the sealing member 85, that is, within the area where the liquid crystal layer 13 is formed. By contrast, the electrode 88 is so formed that a part thereof protrudes out of the area where the liquid crystal layer 13 is formed and faces the sealing member 85.

With the structure of this embodiment, the potential difference between the first transparent substrate 11 side electrodes and the second transparent substrate 12 side electrodes can be made twice as large as in the third embodiment, and thus the phase of the light transmitted through the liquid crystal layer 13 can be varied in a range twice as wide. Thus, it is possible to correct large coma easily. On the other hand, in a case where the variation of the phase of the transmitted light is equal to that in the third embodiment, the voltage applied between the first transparent substrate 11 side electrodes and the second transparent substrate 12 side electrodes can be reduced to half as high as in the third embodiment.

Seventh Embodiment

A seventh embodiment of the present invention will be described below with reference to the relevant drawings. Such parts as find their counterparts in any of the first to sixth embodiments will be identified by common reference numerals, and no explanation thereof will be repeated.

Figure 23A:
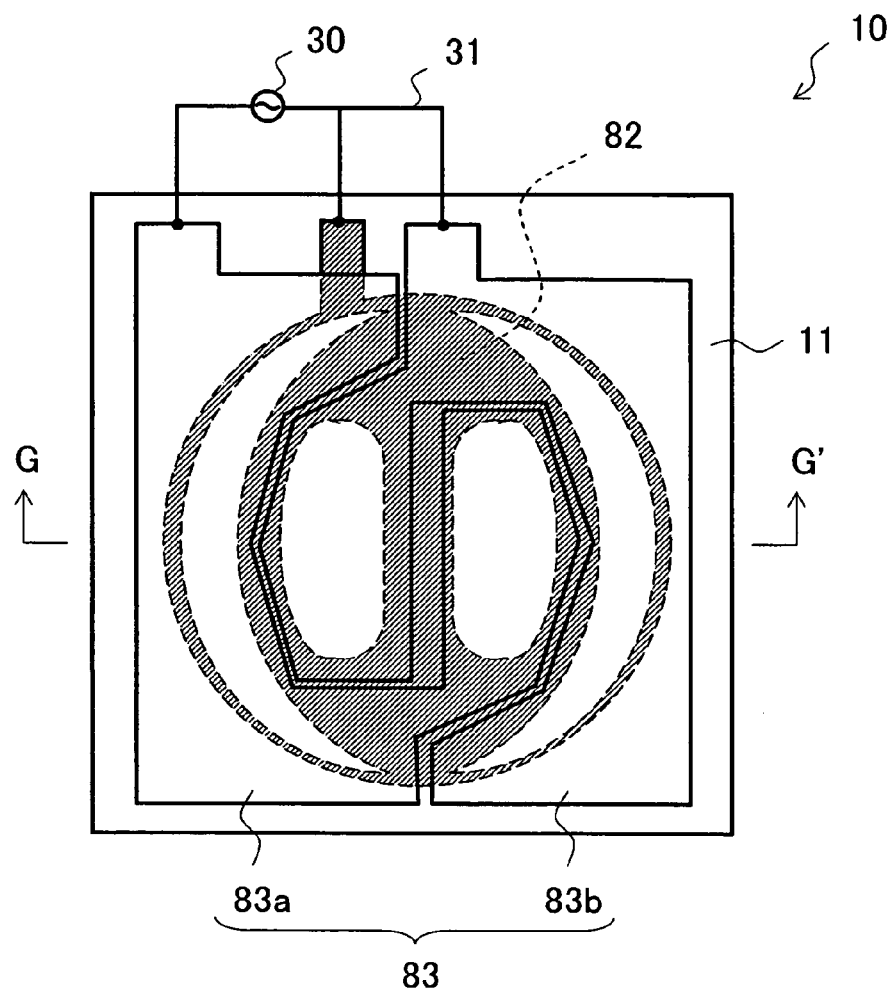
FIG. 23A is a plan view showing an outline of the structure of the optical element of a seventh embodiment of the present invention.
Figure 23B:
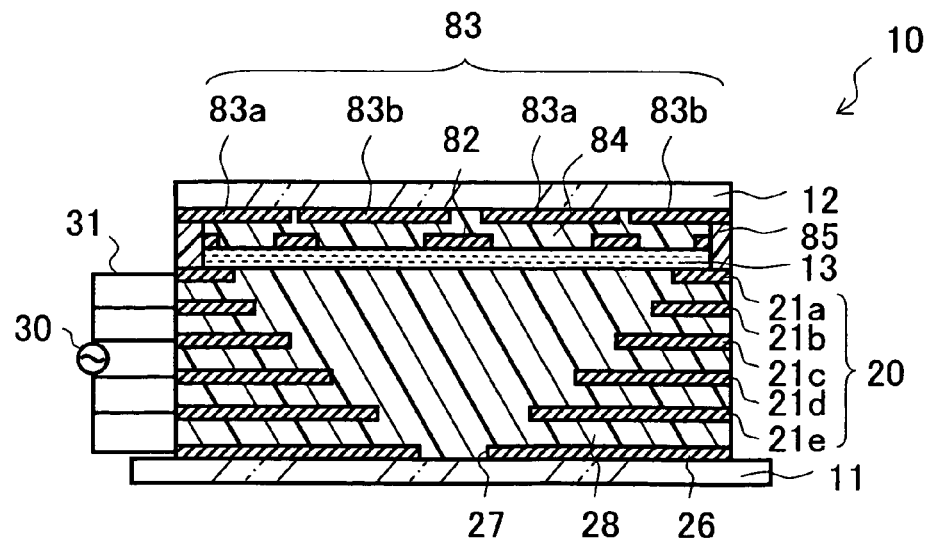
FIG. 23B is a cross-sectional view along line G-G' shown in FIG. 23A as viewed in the arrow-indicated direction.

FIG. 23A is a plan view showing an outline of the structure of the optical element 10 of this embodiment, and FIG. 23B is a cross-sectional view thereof along line G-G' shown in FIG. 23A as viewed in the arrow-indicated direction. It should be noted that, in FIG. 23A, a second transparent substrate 12 is omitted from illustration. The optical element 10 of this embodiment is built as a combination of the third and first embodiments. Superficially, in the optical element 10 of this embodiment, the electrode pattern on the second transparent substrate 12 side of the liquid crystal layer 13 is the same as in the third embodiment, and the electrode pattern on the first transparent substrate 11 side of the liquid crystal layer 13 is the same as in the first embodiment.

Described in detail, the electrode pattern on the first transparent substrate 11 side of the liquid crystal layer 13 is as follows. On the first transparent substrate 11 side of the liquid crystal layer 13, an electrode 20 is arranged, which is composed of a plurality of individual electrodes 21a to 21e that are laid on one another with insulating layers 28 laid in between and that have holes 27. Here, the individual electrode 21a is arranged closest to the liquid crystal layer 13. When viewed from a perspective perpendicular to the liquid crystal layer 13, the holes 27 of the individual electrodes 21a to 21e are so formed that their rims do not overlap one another, that they are increasingly small away from the liquid crystal layer 13, and that they describe concentric circles.

With this structure, by controlling the voltages applied to the electrodes 82 and 83 and to the individual electrodes 21a to 21e and thereby varying the refractive index of the liquid crystal layer 13, it is possible to obtain a capability to correct coma and in addition a capability to correct spherical aberration and also a capability to act as a lens (by varying the focal length). That is, with a single optical element 10, it is possible to correct both coma and spherical aberration. Moreover, by providing a plurality of individual electrodes 21a to 21e, it is possible to widen the range in which the focal length can be varied.

Moreover, as shown in FIG. 23B, by giving, of every two adjacent individual electrodes (for example, the individual electrodes 21a and 21b) with the insulating layer 28 laid in between, the one farther from the liquid crystal layer 13 (for example the individual electrode 21b) an exterior diameter larger than the diameter of the hole of the one closer to the liquid crystal layer 13 (for example the individual electrode 21a), it is possible to arrange the conductors 31 for applying voltages to the individual electrodes outside the area in which the electric field distribution is produced. That is, the conductors 31 can be arranged so as not to directly face the liquid crystal layer 13. This helps avoid the influence of the conductors 31 on the electric field distribution.

Eighth Embodiment

An eighth embodiment of the present invention will be described below with reference to the relevant drawings. Such parts as find their counterparts in any of the first to seventh embodiments will be identified by common reference numerals, and no explanation thereof will be repeated.

Figure 24A:
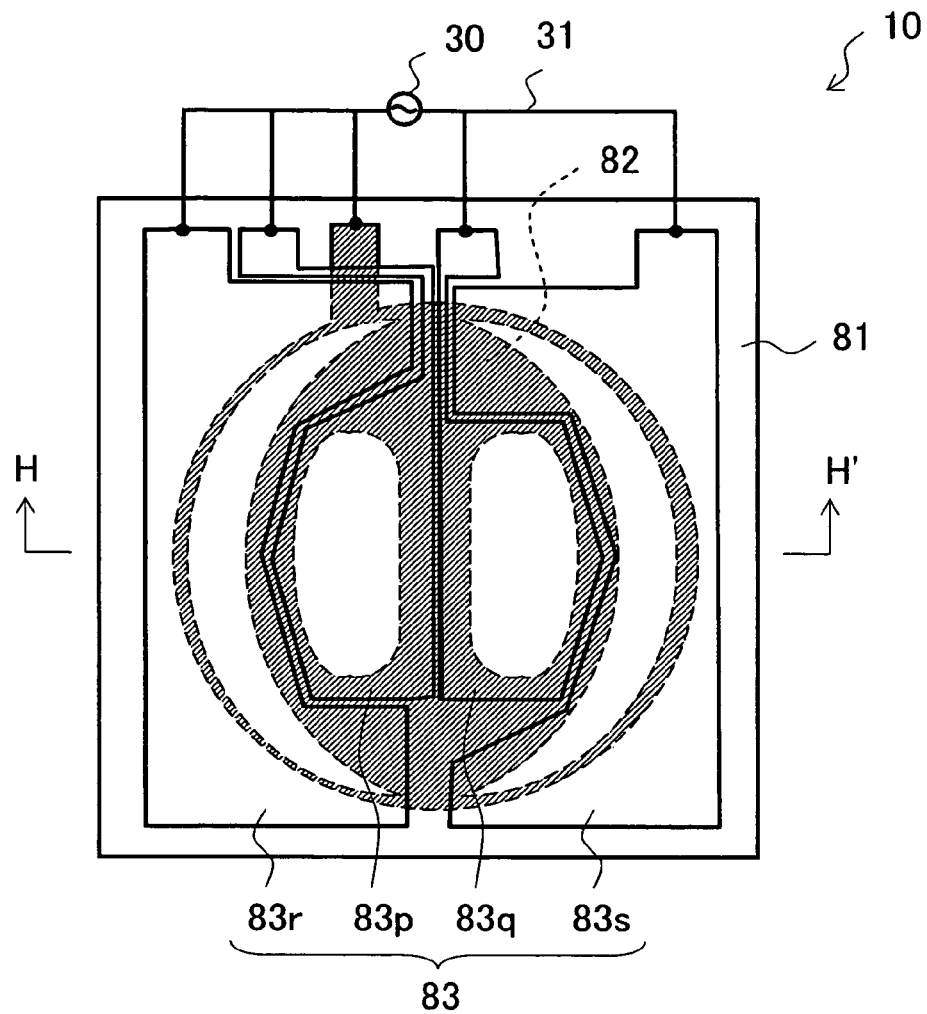
FIG. 24A is a plan view showing an outline of the structure of the optical element of an eighth embodiment of the present invention.
Figure 24B:
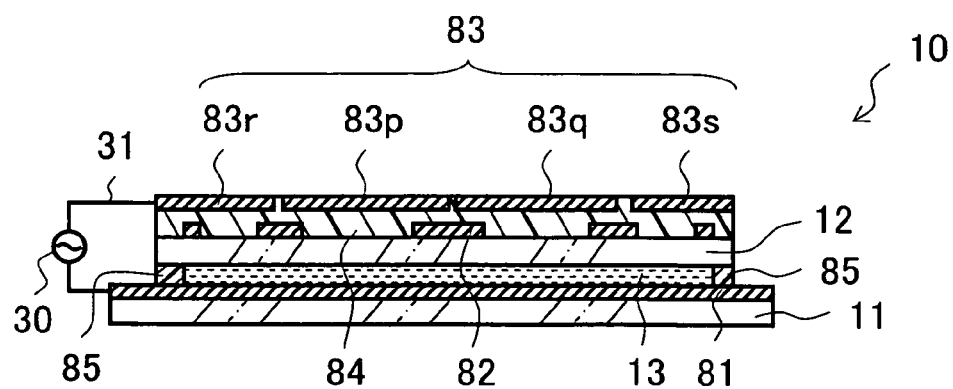
FIG. 24B is a cross-sectional view along line H-H' shown in FIG. 24A as viewed in the arrow-indicated direction.

FIG. 24A is a plan view showing an outline of the structure of the optical element 10 of this embodiment, and FIG. 24B is a cross-sectional view thereof along line H-H' shown in FIG. 24A as viewed in the arrow-indicated direction. The optical element 10 of this embodiment has the same structure as that of the fifth embodiment except that the electrode 83, which is located farthest from the liquid crystal layer 13, is composed of as many electrodes as the holes 82a and 82b of the electrode 82, which is the individual electrode adjacent to the electrode 83. Specifically, since the holes 82a and 82b of the electrode 82 are composed of four holes $82a_1$, $82a_2$, $82b_1$, and $82b_2$, the electrode 83 is composed of four electrodes 83p, 83q, 83r, and 83s.

Figure 25:
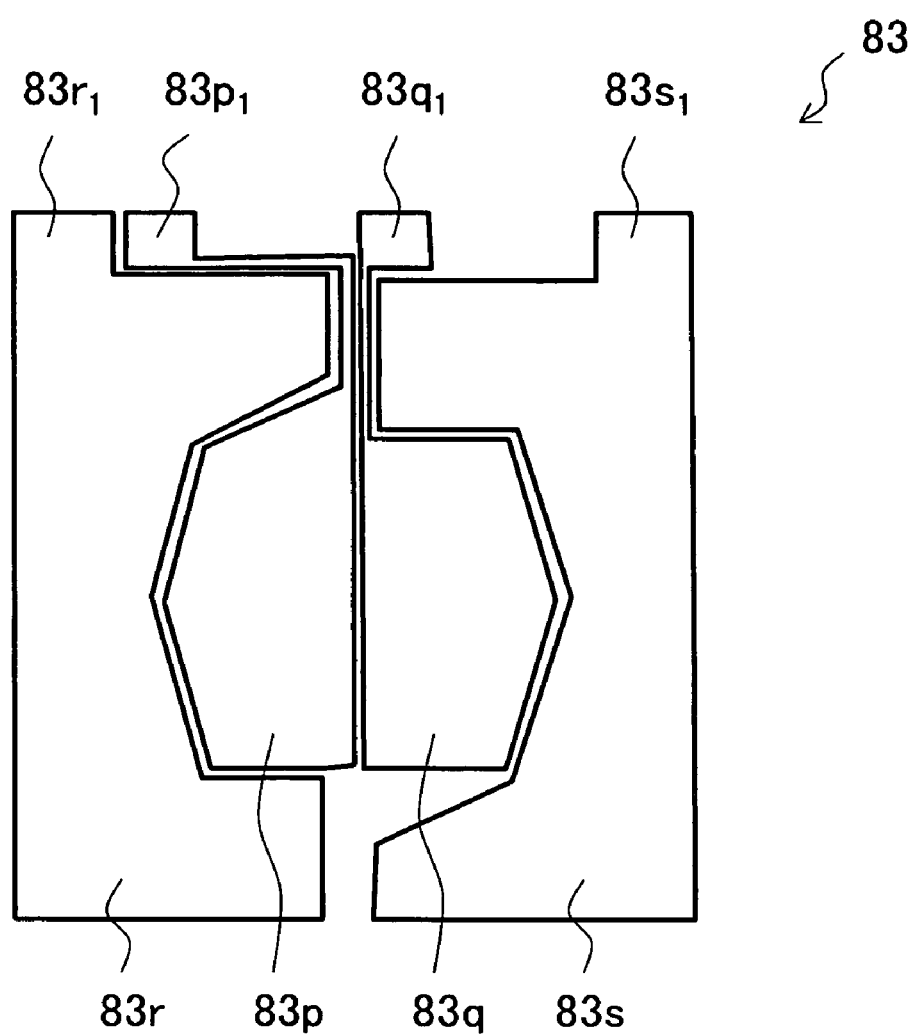
FIG. 25 is a plan view showing an outline of the structure of the individual electrode farthest from a liquid crystal layer in the optical element.

FIG. 25 is a plan view showing an outline of the structure of the electrode 83 in this embodiment. The electrodes 83p, 83q, 83r, and 83s are so formed as to cover the holes $82a_1$, $82a_2$, $82b_1$, and $82b_2$, respectively, of the electrode 82. Moreover, the electrodes 83p and 83r and the electrodes 83q and 83s are formed in substantially line-symmetric shapes, except in lead portions $83p_1$, $83r_1$, $83q_1$, and $83s_1$ thereof described later.

The electrodes 83p and 83s may be regarded as the electrode 83b of the fifth embodiment as divided in two, and the electrodes 83q and 83r as the electrode 83a of the fifth embodiment as divided in two.

The electrodes 83p, 83q, 83r, and 83s have parts thereof protruding out of the optical path to form lead portions $83p_1$, $83q_1$, $83r_1$, and $83s_1$, respectively. To these lead portions $83p_1$, $83q_1$, $83r_1$, and $83s_1$, conductors 31 leading to the voltage applying means 30 are connected.

Figure 26:
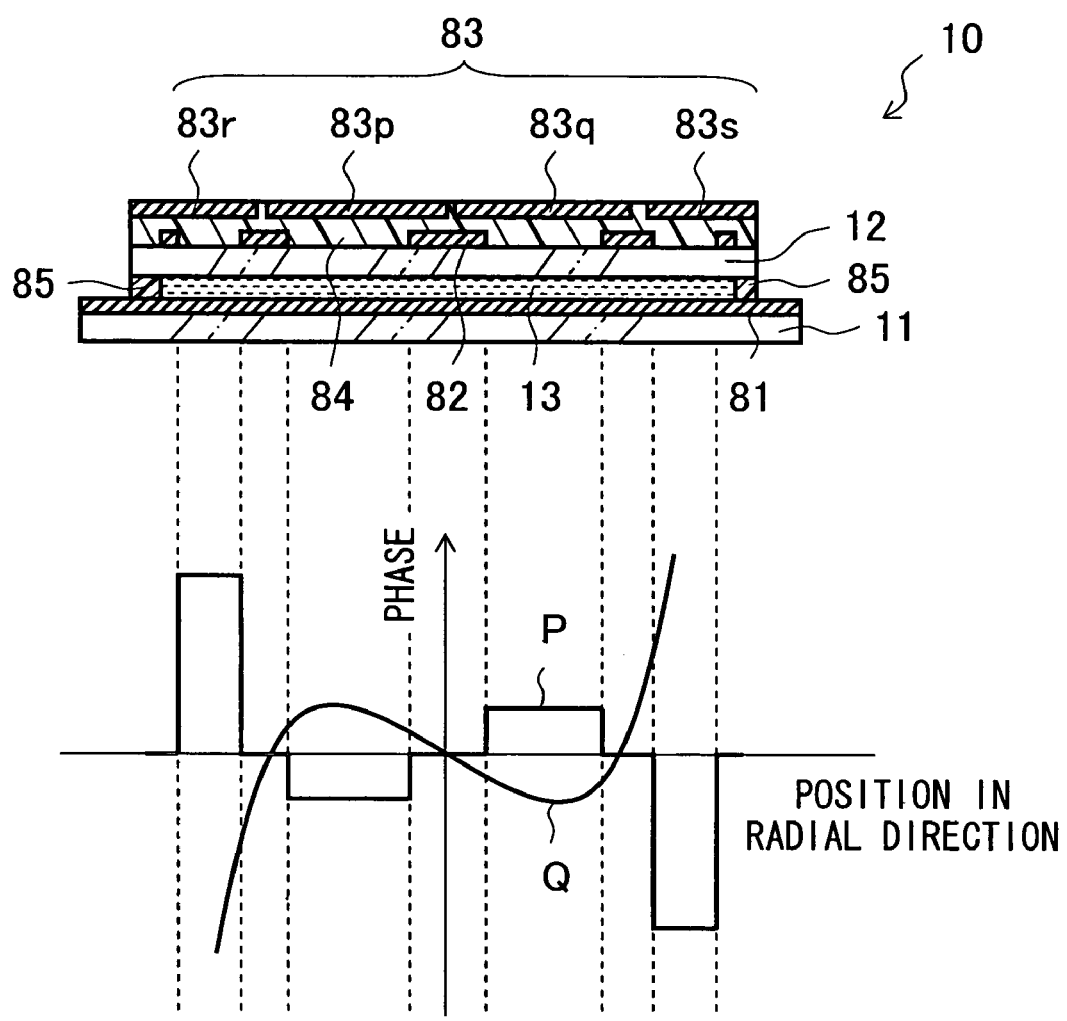
FIG. 26 is a diagram illustrating the phase of the light transmitted through the liquid crystal layer of the optical element and the coma observed.

FIG. 26 shows the phase (solid line P) of the light transmitted through the liquid crystal layer 13 of the optical element 10 of this embodiment and the coma observed (solid line Q). In this embodiment, the electrode 83 farthest from the liquid crystal layer 13 is composed of as many electrodes 83p, 83q, 83r, and 83s as the total number of holes 82a and 82b in the electrode 82, which is an individual electrode in another layer. This helps increase the flexibility with which voltages can be controlled when correcting coma, and thus helps increase the flexibility with which the phase of the light transmitted through the liquid crystal layer 13 can be controlled.

That is, it is possible to control the voltages applied to the electrode 83 independently (hence finely) for each of the electrodes 83p, 83q, 83r, and 83s corresponding to the holes $82a_1$, $82a_2$, $82b_1$, and $82b_2$ of the electrode 82. This makes it possible, in the liquid crystal layer 13, to make greatly different the electric field distribution between in the area where the electrodes 81 and 83p face each other through the hole $82a_1$ and in the area where the electrodes 81 and 83s face each other through the hole $82b_2$, and thus to give the light transmitted through the liquid crystal layer 13 a large phase difference between those areas. This makes it possible to control the phase of the transmitted light flexibly according to the coma actually observed, and thus to achieve proper correction according to the coma actually observed.

Figure 27:
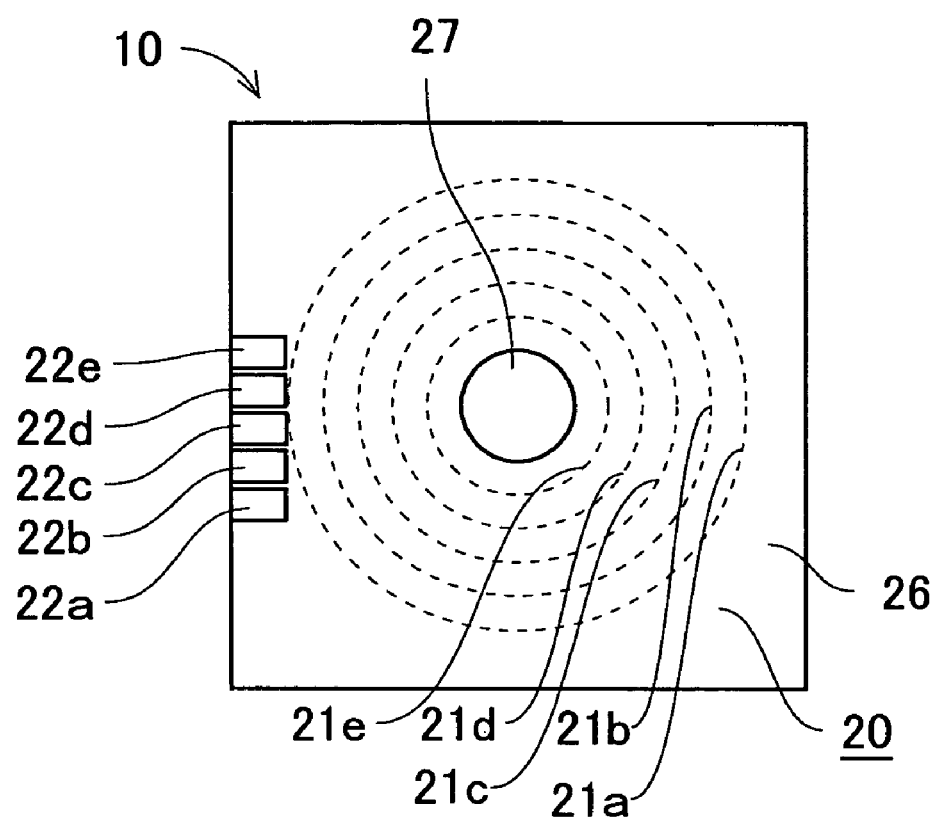
FIG. 27 is a plan view showing another example of the structure of the optical element of the first embodiment.
Figure 28:
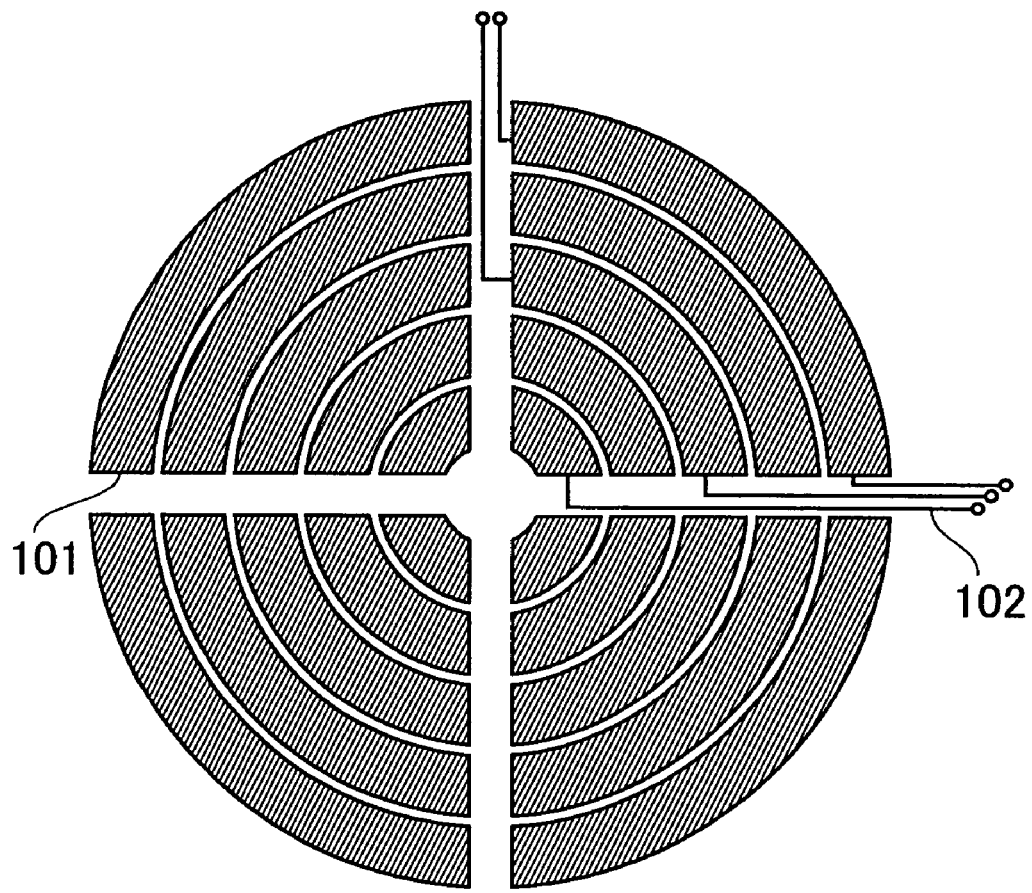
FIG. 28 is a plan view of electrodes in a conventional optical element.

In FIG. 5, which shows the first embodiment described earlier, the second electrode 20 and the unillustrated liquid crystal layer (in particular, the part thereof surrounded with the sealing member) are assumed to have a circular exterior shape; instead, as shown in FIG. 27, these may have a rectangular or any other shape. Conversely, in the other embodiments, the electrodes and the liquid crystal layer that are assumed to have a rectangular exterior shape may instead have a circular or any other shape.

It should be understood that all the figures that have been referred to in the course of the description hereinbefore are merely schematic diagrams, and therefore that, in those figures, the dimensions of transparent substrates, electrodes, liquid crystal layers, insulating layers, etc. are shown on different scales in different directions and thus do not reflect actual proportions. Needless to say, the structures of different embodiments may be combined together.

Optical elements according to the present invention can be used as convex lenses, concave lenses, diffraction gratings, aberration correcting elements, and the like, and find application in optical pickups.

As described above, according to one aspect of the present invention, an optical element is provided with: a liquid crystal layer; a first transparent substrate arranged on one side of the liquid crystal layer; a first electrode transparent and arranged on the one side of the liquid crystal layer; a second transparent substrate arranged on the other side of the liquid crystal layer; a second electrode arranged on the other side of the liquid crystal layer and including a plurality of individual electrodes having holes; a third electrode arranged on the side of the second electrode facing away from the liquid crystal layer; an insulating layer laid between the individual electrodes and the third electrode; and a voltage applier for applying voltages between the first electrode and the second and third electrodes. Here, the holes of the individual electrodes are increasingly small away from the liquid crystal layer.

According to another aspect of the present invention, an optical element is provided with: a liquid crystal layer; a first transparent substrate arranged on one side of the liquid crystal layer; a first electrode transparent and arranged on the one side of the liquid crystal layer; a second transparent substrate arranged on the other side of the liquid crystal layer; a second electrode arranged on the other side of the liquid crystal layer and including one or more individual electrodes having holes; a third electrode arranged on the side of the second electrode facing away from the liquid crystal layer; an insulating layer arranged between the individual electrodes and the third electrode; and a voltage applier for applying voltages between the first electrode and the second and third electrodes. Here, of the individual electrodes of the second electrode, the one closest to the liquid crystal layer has a transparent part within the optical path, and is so formed as to be continuous within the optical path and to have a hole within the optical path.

In the optical elements described above, it is preferable that the second electrode include two or more of the individual electrodes, and that the holes of the individual electrodes be increasingly small away from the liquid crystal layer. This helps widen the range in which the focal length can be varied, and helps control the electric field distribution finely.

According to the present invention, it is preferable that, when viewed from a perspective perpendicular to the liquid crystal layer, the rims of the holes of the individual electrodes not overlap one another, that the exterior diameter of each of the individual electrodes except the one closest to the liquid crystal layer be larger than the diameter of the hole of the individual electrode located adjacently on the liquid crystal layer side thereof, and that the exterior diameter of the third electrode be larger than the diameter of the hole of the individual electrode located adjacent thereto.

Since the exterior diameter of each individual electrode is larger than the diameter of the hole of the individual electrode located adjacently on the liquid crystal layer side thereof, as viewed from a perspective perpendicular to the liquid crystal layer, no gap is left between the individual electrodes, and thus the conductors to the individual electrodes do not directly face the first electrode. Thus, the conductors do not influence the electric field produced when voltages are applied between the first electrode and the second and third electrodes.

According to the present invention, the second electrode may include transparent individual electrodes and non-transparent individual electrodes. A non-transparent individual electrode acts as an aperture stop. Thus, by making some of the individual electrodes of the second electrode non-transparent, it is possible to reduce the spherical aberration produced by the optical element acting as a lens.

According to the present invention, the third electrode may have a hole of which the diameter is smaller than the diameter of, of the holes of the individual electrodes, the smallest one. Here, when viewed from a perspective perpendicular to the liquid crystal layer, the rim of the hole of the third electrode may not overlap any of the rims of the holes of the second electrode. Forming a hole in the third electrode in this way helps further widen the range in which the focal length can be varied.

According to the present invention, the third electrode may be non-transparent. Making the third electrode having a hole non-transparent permits the third electrode to act as an aperture stop. This helps reduce the spherical aberration produced by the optical element acting as a lens.

According to the present invention, it is preferable that, when viewed from a perspective perpendicular to the liquid crystal layer, the holes of the individual electrodes of the second electrode and the hole of the third electrode describe concentric circles. By making the holes of the second electrode and the hole of the third electrode concentric, it is possible to make the electric field distribution, and hence the refractive index distribution of the liquid crystal, axisymmetric about the center axis through the holes. This helps enhance the accuracy with which the optical element acts as a lens.

According to the present invention, the third electrode may be transparent and holeless. This makes the positioning of the third electrode easy during the fabrication of the optical element, and thus helps enhance fabrication efficiency.

According to the present invention, the second transparent substrate may be arranged between the liquid crystal layer and the second electrode. By arranging the second transparent substrate between the second electrode and the liquid crystal layer and thereby increasing the interval between the first electrode and the second and third electrodes, it is possible, even in a case where the holes in the second and third electrode are large, to vary the electric field distribution over a wide area in the liquid crystal layer. This makes it possible to vary the refractive index of the liquid crystal layer over an accordingly wide area, and thus to widen the range in which the focal length can be varied.

In the optical element according to the present invention, part thereof may be carved out, starting from near the outer edge of the top surface of the third electrode, so as to expose part of each of the individual electrodes of the second electrode. That is, the optical element according to the present invention may further have a carved-out portion where part thereof is carved out along the optical axis, starting from near the outer edge of the top surface of the third electrode, so as to expose part of each of the individual electrodes of the second electrode, so that, through this carved-out portion, part of the top surface of each individual electrode is exposed.

Forming a carved-out portion starting from near the outer edge of the top surface of the third electrode so as to expose part of each individual electrode permits the exposed parts of the individual electrodes to be used as contacts at which conductors are easily fitted to the individual electrodes. This helps enhance the fabrication efficiency of products incorporating the optical elements.

According to the present invention, the second transparent substrate may be arranged on the side of the third electrode facing away from the liquid crystal layer. By arranging the second transparent substrate on the side of the third electrode facing away from the liquid crystal layer, that is, by arranging it in the outermost layer, and thereby reducing the interval between the first electrode and the second and third electrodes, it is possible to make the electric force lines produced between these electrodes perpendicular thereto and substantially parallel to one another. This makes it possible to produce a clear pattern such as a Fresnel zone pattern in the liquid crystal layer, and thereby to make the optical element according to the present invention act not only as a lens but also as an optical element that is used to correct aberrations in an optical pickup for DVDs and the like.

According to the present invention, the voltage applier may apply the voltages between the first electrode and the second and third electrodes such that the potential at the third electrode is equal to or lower than the potential at the second electrode. This permits the optical element to act as a convex lens.

According to the present invention, the voltage applier may apply the voltages between the first electrode and the second and third electrodes such that the potential at the third electrode is higher than the potential at the second electrode. This permits the optical element to act as a concave lens.

According to another aspect of the present invention, an optical element is provided with: a liquid crystal layer; a first transparent substrate arranged on one side of the liquid crystal layer; a first electrode arranged on the one side of the liquid crystal layer and including a plurality of individual electrodes having holes; a second electrode arranged on the side of the first electrode facing away from the liquid crystal layer; a first insulating layer for insulating the individual electrodes of the first electrode from the second electrode; a second transparent substrate arranged on the other side of the liquid crystal layer; a third electrode arranged on the other side of the liquid crystal layer and including a plurality of individual electrodes having holes; a fourth electrode arranged on the side of the third electrode facing away from the liquid crystal layer; a second insulating layer for insulating the individual electrodes of the third electrode from the fourth electrode; and a voltage applier for applying voltages between the first and second electrodes and the third and fourth electrodes. Here, the holes of the individual electrodes of the first electrode are increasingly small away from the liquid crystal layer, and the holes of the individual electrodes of the third electrode are increasingly small away from the liquid crystal layer.

In the optical element described above, the first and second transparent substrates may each be a flat plate. Building the first and second transparent substrates as inexpensive flat plates in this way makes it possible to fabricate the optical element inexpensively.

According to another aspect of the present invention, an optical element is provided with: a liquid crystal layer; transparent substrates arranged one on each side of the liquid crystal layer; electrodes arranged one on each side of the liquid crystal layer; and a voltage applier for applying voltages to the electrodes to vary the alignment of the liquid crystal molecules in the liquid crystal layer. Here, the electrode arranged on one side of the liquid crystal layer is composed of a plurality of individual electrodes that are laid on one another with an insulating layer laid in between, and, of the individual electrodes, the one closest to the liquid crystal layer has a transparent part within the optical path, and is so formed as to be continuous within the optical path and to have a hole within the optical path.

According to the present invention, the individual electrodes may be laid in three or more layers. Here, of the individual electrodes, those other than the one farthest from the liquid crystal layer may be so formed as to be continuous within the optical path and to have holes within the optical path, and the holes of these other individual electrodes may be formed increasingly small away from the liquid crystal layer.

When the individual electrodes are laid in three or more layers, and, of the individual electrodes, those other than the one farthest from the liquid crystal layer are so formed as to be continuous within the optical path and to have holes within the optical path, there is no need to lay, within the optical path, conductors for applying voltages to the individual electrodes, and thus it is possible to eliminate the influence of the conductors on the electric field distribution. When the holes of these other individual electrodes are formed increasingly small away from the liquid crystal layer, it is possible to control the electric field distribution finely.

According to the present invention, the hole of the individual electrode closest to the liquid crystal layer may be formed in a position corresponding to a peak of coma. That is, the individual electrode closest to the liquid crystal layer may include a hole formed in a position corresponding to a peak of coma. This permits the electric field in the liquid crystal layer to be so produced as to correct coma.

According to the present invention, the individual electrodes may be laid in three or more layers. In this case, of the individual electrodes, the one in the second layer away from the liquid crystal layer may be formed as to be continuous within the optical path and to have a hole within the optical path, the hole of the individual electrode in the second layer away from the liquid crystal layer may be formed in a position corresponding to a peak of coma, and the hole of the individual electrode in the second layer away from the liquid crystal layer may be formed smaller than the hole of the individual electrode closest to the liquid crystal layer.

When the individual electrode in the second layer away from the liquid crystal layer is so formed as to be continuous within the optical path and to have a hole within the optical path, for the same reason as noted previously, it is possible to avoid degradation of the characteristics of the optical element attributable to conductors, and it is also possible to vary the electric field distribution according to where the hole is formed so as to correct various aberrations.

Furthermore, when the above-mentioned individual electrode includes a hole formed in a position corresponding to a peak of coma, it is possible to produce the electric field distribution in the liquid crystal layer in a way that corrects coma. Here, when the hole of the individual electrode in the second layer away from the liquid crystal layer is formed smaller than the hole of the individual electrode closest to the liquid crystal layer, it is possible to control the electric field distribution finely, and thus to correct coma finely.

According to the present invention, of the individual electrodes, the one farthest from the liquid crystal layer may be so formed as to cover the holes of the other individual electrodes. In this structure, at least one individual electrode always exists along the optical axis. That is, when viewed from a perspective perpendicular to the liquid crystal layer, any gap (hole) between individual electrodes in the same layer is filled by another individual electrode (the individual electrode farthest from the liquid crystal layer), so that the individual electrodes cover the entire area of the liquid crystal layer with no gap. This makes it possible to control the refractive index of the liquid crystal layer over the entire area thereof.

According to the present invention, the individual electrode farthest from the liquid crystal layer may be composed of a plurality of electrode segments laid in the same layer. This makes it possible to apply different voltage to the different electrode segments. Thus, the phase of the light transmitted through the area of the liquid crystal layer corresponding one electrode segment can be made to lead or delay relative to the phase of the light transmitted through the area of the liquid crystal layer corresponding another electrode segment. This makes it possible to correct coma properly.

In the structure described above, the individual electrode farthest from the liquid crystal layer may be composed of as many electrode segments as there are holes in the individual electrode adjacent thereto. This makes it possible to control the applied voltages independently for each of the electrode segments corresponding to the different holes of the adjacent individual electrode. This helps increase the flexibility with which voltages can be controlled when correcting coma, and thus helps increase the flexibility with which the phase of the light transmitted through the liquid crystal layer can be controlled. As a result, it is possible to achieve proper correction according to the coma actually observed.

According to the present invention, the electrode segments may include one to which, despite in the same layer as the other electrode segments, a voltage different from the voltage applied to the other electrode segments is applied. This makes it possible to correct coma properly.

According to the present invention, the individual electrodes may be formed on the side of the previously-mentioned one of the transparent substrates facing away from the liquid crystal layer. In this case, between the liquid crystal layer and the individual electrodes, one of the transparent substrates is located. This makes it possible to produce an electric field distribution not only in the area of the liquid crystal layer directly facing the individual electrodes but over a wide area of the liquid crystal layer. That is, it is possible, over a wide area of the liquid crystal layer, to form a refractive index distribution smoothly and make it vary continuously. This makes smooth aberration correction possible.

According to the present invention, the individual electrodes may be formed on the side of the one of the transparent substrates facing toward the liquid crystal layer, with an insulating layer laid between the individual electrodes and the liquid crystal layer.

In this structure, between the liquid crystal layer and the individual electrodes, an insulating layer is formed. This makes it possible to produce an electric field distribution not only in the area of the liquid crystal layer directly facing the individual electrodes but over a wide area of the liquid crystal layer. That is, it is possible, over a wide area of the liquid crystal layer, to form a refractive index distribution smoothly and make it vary continuously. This makes smooth aberration correction possible.

According to the present invention, the electrode pattern on the other side of the liquid crystal layer and the electrode pattern on the one side of the liquid crystal layer may be symmetric with each other about the liquid crystal layer.

This makes it possible to make the potential difference between the electrode on the side of one transparent substrate and the electrode on the side of the other transparent electrode twice as large as when an electrode is formed only in one layer, for example, on the side of the other transparent substrate, and thus to make the variation of the phase of the transmitted light twice as large. On the other hand, in a case where the variation of the phase of the transmitted light is not varied, it is possible to make the voltages applied to the electrode on the side of one transparent substrate and the electrode on the side of the other transparent electrode half as high.

According to the present invention, the electrode on the other side of the liquid crystal layer may be composed of a plurality of individual electrodes that are laid on one another with an insulating layer laid in between and that have holes, and the holes of the individual electrodes may be formed increasingly small away from the liquid crystal layer so that, when viewed from a perspective perpendicular to the liquid crystal layer, the rims of the holes of the individual electrodes do not overlap one another.

In this case, by controlling the voltages applied to the individual electrodes and thereby varying the refractive index of the liquid crystal layer, it is possible, more effectively, to obtain a capability to correct spherical aberration and a capability to act as a lens while varying the focal length thereof.

In the structure described above, of every two of the individual electrodes adjacent to each other across the insulating layer laid in between, the one farther from the liquid crystal layer may have a larger exterior diameter than the diameter of the hole of the one closer to the liquid crystal layer. This makes it possible to lay the conductors for applying voltages to the individual electrodes outside the area where the electric field distribution is produced. This helps avoid the influence of the conductors on the electric field distribution.

Obviously, many modifications and variations of the present invention are possible in light of the above teachings. It is therefore to be understood that within the scope of the appended claims, the invention may be practiced other than as specifically described.

What is claimed is:

1. An optical element comprising:
   a liquid crystal layer;
   a first transparent substrate arranged on one side of the liquid crystal layer;
   a first electrode transparent and arranged on said one side of the liquid crystal layer;
   a second transparent substrate arranged on another side of the liquid crystal layer;
   a second electrode arranged on said another side of the liquid crystal layer and including a plurality of individual electrodes having holes;
   a third electrode arranged on an opposite side of the liquid crystal layer with respect to the second electrode;
   an insulating layer laid between the individual electrodes and the third electrode; and
   a voltage applier for applying voltages between the first electrode and the second and third electrodes,
   wherein the individual electrodes are laid as a plurality of layers divided by the insulating layer and located in a direction perpendicular to the liquid crystal layer,
   wherein the holes of the individual electrodes become increasingly small as going away from the liquid crystal layer and are overlapped from each other at the center portion thereof when viewed from a perspective perpendicular to the liquid crystal layer,
   wherein when viewed from a perspective perpendicular to the liquid crystal layer, the rims of the holes of the individual electrodes do not overlap one another,
   wherein an exterior diameter of each of the individual electrodes except the individual electrode closest to the liquid crystal layer is larger than a diameter of the hole of the individual electrode located adjacently on a liquid crystal layer side thereof, and
   wherein an exterior diameter of the third electrode is larger than a diameter of the hole of the individual electrode located adjacent thereto.

2. The optical element of claim 1, wherein
   the second electrode includes transparent individual electrodes and non-transparent individual electrodes.

3. The optical element of claim 1, wherein
   the third electrode has a hole of which a diameter is smaller than a diameter of, of the holes of the individual electrodes, the smallest hole, and
   when viewed from a perspective perpendicular to the liquid crystal layer, a rim of the hole of the third electrode does not overlap any of rims of the holes of the second electrode.

4. The optical element of claim 3, wherein
   the third electrode is non-transparent.

5. The optical element of claim 3, wherein
   when viewed from a perspective perpendicular to the liquid crystal layer, the holes of the individual electrodes of the second electrode and the hole of the third electrode describe concentric circles.

6. The optical element of claim 1, wherein
   the third electrode is transparent and holeless.

7. The optical element of claim 1, wherein
   the second transparent substrate is arranged between the liquid crystal layer and the second electrode.

8. The optical element of claim 7, wherein
   part of a top surface of the third electrode is carved out, starting from near an outer edge thereof, so as to expose part of each of the individual electrodes of the second electrode.

9. The optical element of claim 1, wherein
   the second transparent substrate is arranged on a side of the third electrode facing away from the liquid crystal layer.

10. The optical element of claim 1, wherein
    the voltage applier applies the voltages between the first electrode and the second and third electrodes such that a potential at the third electrode is equal to or lower than a potential at the second electrode.

11. The optical element of claim 1, wherein
    the voltage applier applies the voltages between the first electrode and the second and third electrodes such that a potential at the third electrode is higher than a potential at the second electrode.

12. The optical element of claim 1, wherein
    the first and second transparent substrates are each a flat plate.

13. An optical element comprising:
    a liquid crystal layer;
    a first transparent substrate arranged on one side of the liquid crystal layer;
    a first electrode arranged on said one side of the liquid crystal layer and including a plurality of individual electrodes having holes;
    a second electrode arranged on a side of the first electrode facing away from the liquid crystal layer;
    a first insulating layer for insulating the individual electrodes of the first electrode from the second electrode;
    a second transparent substrate arranged on another side of the liquid crystal layer;
    a third electrode arranged on said another side of the liquid crystal layer and including a plurality of individual electrodes having holes;
    a fourth electrode arranged on a side of the third electrode facing away from the liquid crystal layer;
    a second insulating layer for insulating the individual electrodes of the third electrode from the fourth electrode; and
    a voltage applier for applying voltages between the first and second electrodes and the third and fourth electrodes,
    wherein
    the rims of the holes of the individual electrodes of the first electrode do not overlap one another when viewed from a perspective perpendicular to the liquid crystal layer,
    an exterior diameter of each of the individual electrodes of the first electrode except the individual electrode closest to the liquid crystal layer is larger than a diameter of the hole of the individual electrode located adjacently on a liquid crystal layer side thereof,
    the holes of the individual electrodes of the first electrode are increasingly small away from the liquid crystal layer, and the holes of the individual electrodes of the third electrode are increasingly small away from the liquid crystal layer.

14. An optical element comprising:
a liquid crystal layer;
transparent substrates arranged one on each side of the liquid crystal layer;
electrodes arranged one on each side of the liquid crystal layer; and
a voltage applier for applying voltages to the electrodes to vary alignment of liquid crystal molecules in the liquid crystal layer,
wherein
the electrode arranged on one side of the liquid crystal layer includes a plurality of individual electrodes that are laid on one another with an insulating layer laid in between,
the individual electrodes have holes which become increasingly small as going away from the liquid crystal layer and are overlapped with each other at the center portion thereof when viewed from a perspective perpendicular to the liquid crystal layer,
the rims of the holes of the individual electrodes do not overlap one another when viewed from a perspective perpendicular to the liquid crystal layer, and
an exterior diameter of each of the individual electrodes except the individual electrode closest to the liquid crystal layer is larger than a diameter of the hole of the individual electrode located adjacently on a liquid crystal layer side thereof.

15. The optical element of claim 14, wherein
the hole of the individual electrode closest to the liquid crystal layer is formed in a position corresponding to a peak of coma.

16. The optical element of claim 15, wherein
the individual electrodes are laid in three or more layers,
of the individual electrodes, the individual electrode in a second layer away from the liquid crystal layer is so formed as to be continuous within the optical path and to have a hole within the optical path;
the hole of the individual electrode in the second layer away from the liquid crystal layer is formed in a position corresponding to a peak of coma, and
the hole of the individual electrode in the second layer away from the liquid crystal layer is formed smaller than the hole of the individual electrode closest to the liquid crystal layer.

17. The optical element of claim 14, wherein
of the individual electrodes, the individual electrode farthest from the liquid crystal layer is so formed as to cover the holes of the other individual electrodes.

18. The optical element of claim 17, wherein
the individual electrode farthest from the liquid crystal layer is composed of a plurality of electrode segments laid in a same layer.

19. The optical element of claim 18, wherein
the individual electrode farthest from the liquid crystal layer is composed of as many electrode segments as there are holes in the individual electrode adjacent thereto.

20. The optical element of claim 18, wherein
the electrode segments include an electrode segment to which, despite in the same layer as the other electrode segments, a voltage different from a voltage applied to the other electrode segments is applied.

21. The optical element of claim 14, wherein
the individual electrodes are formed on a side, facing away from the liquid crystal layer, of the transparent substrate arranged on said one side of the liquid crystal layer.

22. The optical element of claim 14, wherein
the individual electrodes are formed on a side, facing toward the liquid crystal layer, of the transparent substrate arranged on said one side the liquid crystal layer, with an insulating layer laid between the individual electrodes and the liquid crystal layer.

23. The optical element of claim 14, wherein
an electrode pattern on another side of the liquid crystal layer and an electrode pattern on said one side of the liquid crystal layer are symmetric with each other about the liquid crystal layer.

24. The optical element of claim 14, wherein
the electrode on another side of the liquid crystal layer is composed of a plurality of individual electrodes that are laid on one another with an insulating layer laid in between and that have holes,
the holes of the individual electrodes are formed increasingly small away from the liquid crystal layer so that, when viewed from a perspective perpendicular to the liquid crystal layer, rims of the holes of the individual electrodes do not overlap one another.

25. The optical element of claim 24, wherein
of every two of the individual electrodes adjacent to each other across the insulating layer laid in between, the individual electrode farther from the liquid crystal layer has a larger exterior diameter than the diameter of the hole of the individual electrode closer to the liquid crystal layer.

26. An optical pickup comprising:
an optical element,
the optical element comprising:
a liquid crystal layer;
a first transparent substrate arranged on one side of the liquid crystal layer;
a first electrode transparent and arranged on said one side of the liquid crystal layer;
a second transparent substrate arranged on another side of the liquid crystal layer;
a second electrode arranged on said another side of the liquid crystal layer and including a plurality of individual electrodes having holes;
a third electrode arranged on an opposite side of the liquid crystal layer with respect to the second electrode;
an insulating layer laid between the individual electrodes and the third electrode; and
a voltage applier for applying voltages between the first electrode and the second and third electrodes,
wherein the individual electrodes are laid as a plurality of layers divided by the insulating layer and located in a direction perpendicular to the liquid crystal layer,
wherein the holes of the individual electrodes become increasingly small as going away from the liquid crystal layer and are overlapped from each other at the center portion thereof when viewed from a perspective perpendicular to the liquid crystal layer,
wherein when viewed from a perspective perpendicular to the liquid crystal layer, the rims of the holes of the individual electrodes do not overlap one another,
wherein an exterior diameter of each of the individual electrodes except the individual electrode closest to the liquid crystal layer is larger than a diameter of the hole of the individual electrode located adjacently on a liquid crystal layer side thereof, and
wherein an exterior diameter of the third electrode is larger than a diameter of the hole of the individual electrode located adjacent thereto.

27. An optical element comprising:

a liquid crystal layer;

a first transparent substrate arranged on one side of the liquid crystal layer;

a first transparent electrode arranged on said one side of the liquid crystal layer;

a second transparent substrate arranged on another side of the liquid crystal layer;

a second electrode arranged on said another side of the liquid crystal layer and including a plurality of individual electrode layers substantially parallel to said liquid crystal layer, each individual electrode layer having a hole extending therethrough in a direction perpendicular to said electrode layer, each individual electrode layer being separated from other individual electrode layers by an insulating layer;

a third electrode arranged on a side of the second electrode facing away from the liquid crystal layer;

an insulating layer laid between the second electrode and the third electrode; and a voltage source configured to apply voltages between the first electrode and the second and third electrodes, wherein the individual electrode layers of the second electrode are configured and arranged so that:

the holes in each of the individual electrode layers overlap each other at respective center portions thereof, a size of the hole in each respective individual electrode layer is smaller than a size of a hole in an adjacent individual electrode layer on a side towards said liquid crystal layer, each respective individual electrode layer overlapping a circumferential portion of a liquid-crystal-layer-side adjacent individual electrode layer, said circumferential portion being adjacent to and surrounding the hole in the respective liquid-crystal-layer-side adjacent individual electrode layer.

* * * * *

UNITED STATES PATENT AND TRADEMARK OFFICE
CERTIFICATE OF CORRECTION

PATENT NO. : 7,787,063 B2
APPLICATION NO. : 11/447772
DATED : August 31, 2010
INVENTOR(S) : Satoru Hirose It is certified that error appears in the above-identified patent and that said Letters Patent is hereby corrected as shown below:

Column 32:
Lines 7-18, printed claim 27, delete "the holes in each of the individual electrode layers overlap each other at respective center portions thereof,
a size of the hole in each respective individual electrode layer is smaller than a size of a hole in an adjacent individual electrode layer on a side towards said liquid crystal layer,
each respective individual electrode layer overlapping a circumferential portion of a liquid-crystal-layer-side adjacent individual electrode layer, said circumferential portion being adjacent to and surrounding the hole in the respective liquid-crystal-layer-side adjacent individual electrode layer."

and insert -- the rims of the holes of the individual electrodes do not overlap one another when viewed from a perspective perpendicular to the liquid crystal layer,
an exterior diameter of each of the individual electrodes except the individual electrode closest to the liquid crystal layer is larger than a diameter of the hole of the individual electrode located adjacently on a liquid crystal layer side thereof,
the holes in each of the individual electrode layers overlap each other at respective center portions thereof,
a size of the hole in each respective individual electrode layer is smaller than a size of a hole in an adjacent individual electrode layer on a side towards said liquid crystal layer,
each respective individual electrode layer overlapping a circumferential portion of a liquid-crystal-layer-side adjacent individual electrode layer, said circumferential portion being adjacent to and surrounding the hole in the respective liquid-crystal-layer-side adjacent individual electrode layer. --.

Signed and Sealed this
Fourth Day of January, 2011

David J. Kappos
*Director of the United States Patent and Trademark Office*